(12) United States Patent
Zhang et al.

(10) Patent No.: US 11,854,247 B2
(45) Date of Patent: Dec. 26, 2023

(54) DATA PROCESSING METHOD AND DEVICE FOR GENERATING FACE IMAGE AND MEDIUM

(71) Applicant: Tencent Technology (Shenzhen) Company Limited, Shenzhen (CN)

(72) Inventors: Yong Zhang, Shenzhen (CN); Le Li, Shenzhen (CN); Zhilei Liu, Shenzhen (CN); Baoyuan Wu, Shenzhen (CN); Yanbo Fan, Shenzhen (CN); Zhifeng Li, Shenzhen (CN); Wei Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 439 days.

(21) Appl. No.: 17/328,932

(22) Filed: May 24, 2021

(65) Prior Publication Data

US 2021/0279515 A1 Sep. 9, 2021

Related U.S. Application Data

(63) Continuation of application No. PCT/CN2020/082918, filed on Apr. 2, 2020.

(30) Foreign Application Priority Data

Apr. 26, 2019 (CN) .......................... 201910345276.6

(51) Int. Cl.
*G06K 9/00* (2022.01)
*G06V 10/82* (2022.01)
(Continued)

(52) U.S. Cl.
CPC ............ *G06V 10/82* (2022.01); *G06F 18/213* (2023.01); *G06F 18/214* (2023.01); *G06F 18/22* (2023.01);
(Continued)

(58) Field of Classification Search
CPC .... G06V 10/82; G06V 40/168; G06V 40/172; G06V 10/764; G06F 18/22; G06F 18/214; G06F 18/213
See application file for complete search history.

(56) References Cited

U.S. PATENT DOCUMENTS

2003/0222891 A1* 12/2003 Okamoto ................ G06T 11/00
345/646
2008/0199055 A1* 8/2008 Lee ....................... G06V 40/171
382/118

(Continued)

FOREIGN PATENT DOCUMENTS

| CN | 1490764 A | 4/2004 |
| CN | 103295210 A | 9/2013 |

(Continued)

OTHER PUBLICATIONS

Jiahui Yu et al., "Generative Image Inpainting with Contextual Attention", arXiv, Computer Vision and Pattern Recognition, Jun. 18, 2018, 3 pgs. Retrieved from the Internet: https://arxiv.org/abs/1801.07892.

(Continued)

*Primary Examiner* — Avinash Yentrapati
(74) *Attorney, Agent, or Firm* — Morgan, Lewis & Bockius LLP

(57) ABSTRACT

A computer device obtains a first face image ($I_{MA}$) and a second face image ($I_{FA}$). The device obtains M first image blocks corresponding to facial features from the first face image ($I_{MA}$), and obtains N second image blocks corresponding to facial features from the second face image ($I_{FA}$). The device transforms the M first image blocks and the N second image blocks to a feature space to generate M first feature blocks and N second feature blocks. The device selects a subset of the first feature blocks and a subset of the second feature blocks according to a specified control vec- (Continued)

tor. The device generates a first composite feature map based the selected subset of the first feature blocks and the selected subset of the second feature blocks. The device inversely transforms the first composite feature map back to an image space to generate a third face image.

20 Claims, 13 Drawing Sheets

(51) Int. Cl.
*G06V 40/16* (2022.01)
*G06F 18/214* (2023.01)
*G06F 18/22* (2023.01)
*G06F 18/213* (2023.01)
*G06V 10/764* (2022.01)

(52) U.S. Cl.
CPC .......... *G06V 10/764* (2022.01); *G06V 40/168* (2022.01); *G06V 40/172* (2022.01)

(56) References Cited

U.S. PATENT DOCUMENTS

| | | | |
|---|---|---|---|
| 2017/0301121 A1* | 10/2017 | Whitehill | G06T 3/00 |
| 2018/0253869 A1* | 9/2018 | Yumer | G06T 11/60 |
| 2018/0268201 A1* | 9/2018 | Yu | G06V 10/82 |

FOREIGN PATENT DOCUMENTS

| | | | | |
|---|---|---|---|---|
| CN | 106682632 A | | 5/2017 | |
| CN | 107609506 A | * | 1/2018 | ............ G06T 11/00 |
| CN | 107609506 A | | 1/2018 | |
| CN | 108171124 A | | 6/2018 | |
| CN | 108288072 A | | 7/2018 | |
| CN | 108510437 A | | 9/2018 | |
| CN | 108510473 A | | 9/2018 | |
| CN | 109508669 A | | 3/2019 | |
| CN | 109615582 A | | 4/2019 | |
| CN | 110084193 A | | 8/2019 | |
| JP | 2004005265 A | | 1/2004 | |
| JP | 2005107848 A | | 4/2005 | |
| WO | WO 2008114937 A1 | | 9/2008 | |

OTHER PUBLICATIONS

Hon-Xia Wang et al., "Facial Image Composition Based on Active Appearance Model", 2008 IEEE International Conference on Acoustics, Speech and Signal Processing, May 12, 2008, 4 pgs., Retrieved from the Internet: https://ieeexplore.ieee.org/stamp/stamp.jsp?tp=&arnumber=4517754.

Jun-Yan Zhu et al., "Unpaired Image-to-Image Translation Using Cycle-Consistent Adversarial Networks", 2017 IEEE International Conference on Computer Vision (ICCV), 2017, 10 pgs., Retrieved from the Internet: https://ieeexplore.ieee.org/document/8237506.

Tencent Technology, JP Office Action, Japanese Patent Application No. 2021-534133, Sep 5, 2022, 5 pgs.

Tencent Technology, Korean Office Action, KR Patent Application No. 10-2021-7020518, May 17, 2023, 9 pgs.

Yunjey Choi et al., "StarGAN: Unified Generative Adversarial Networks for Multi-Domain Image-to-Image Translation", 2018 IEEE/CVF Conference on Computer Vision and Pattern Recognition, IEEE, Jun. 18, 2018, XP033473803, 9 pgs.

Extended European Search Report, EP20796212.7, Jun. 13, 2022, 8 pgs.

Xiao Yang et al., "Recognizing Minimal Facial Sketch by Generating Photorealistic Faces with The Guidance of Descriptive Attributes", vol. 6, 2018 IEEE International Conference on Acoustics Speech and Signal Processing (ICASSP), Sep. 13, 2018, ISSN: 2379-190X, 5 pgs.

Tencent Technology, ISR, PCT/CN2020/082918, Jul. 8, 2020, 3 pgs.

Tencent Technology, WO, PCT/CN2020/082918, Jul. 8, 2020, 5 pgs.

Tencent Technology, IPRP, PCT/CN2020/082918, Sep. 28, 2021, 6 pgs.

* cited by examiner

DATA PROCESSING METHOD AND DEVICE FOR GENERATING FACE IMAGE AND MEDIUM

CROSS-REFERENCE TO RELATED APPLICATIONS

This application is a continuation application of the International PCT application No. PCT/CN2020/082918, entitled "DATA PROCESSING METHOD AND DEVICE FOR GENERATING FACE IMAGE AND MEDIUM" and filed on Apr. 2, 2020, which claims priority to Chinese Patent Application No. 201910345276.6, entitled "DATA PROCESSING METHOD AND DEVICE FOR GENERATING FACE IMAGE AND MEDIUM" and filed with the China National Intellectual Property Administration on Apr. 26, 2019, all of which are incorporated herein by reference in their entireties.

FIELD OF THE TECHNOLOGY

This application relates to the field of image processing, and more specifically, to a data processing method and device for generating a face image, a medium, and a computer device.

BACKGROUND OF THE DISCLOSURE

Face image generation technology, as an emerging research field, has broad application prospects in aspects such as child face prediction, criminal image restoration in criminal investigation, and virtual character construction. For example, by inputting a face image, another bran-new face image that is like but different from the face image may be generated as a target image.

In an existing face image generation solution, a general-purpose processing network is used to generate the target image. For example, a face image is inputted to an encoding network and decoding network that are trained, and a target image is then outputted. However, a problem of this image generation solution lies in that, harmony and naturalness of a composite face image outputted by the general-purpose processing network are poor, making it difficult for a user to believe that it is a real face image.

SUMMARY

In view of above, embodiments of this application provide a data processing method and device for generating a face image, a medium, and a computer device, to generate a composite face image closer to a real face image.

According to an aspect of this application, a data processing method for generating a face image is provided, performed by a server (e.g., a computer device or a computer system). The method comprises: obtaining a first face image and a second face image; obtaining M first image blocks corresponding to facial features from the first face image ($I_{MA}$), and obtaining N second image blocks corresponding to facial features from the second face image ($I_{FA}$); transforming the M first image blocks and the N second image blocks to a feature space to generate M first feature blocks and N second feature blocks; selecting a subset of the first feature blocks and a subset of the second feature blocks according to a specified control vector; generating a first composite feature map based on at least the selected subset of the first feature blocks and the selected subset of the second feature blocks; and inversely transforming the first composite feature map back to an image space to generate a third face image, M and N being positive integers greater than one.

According to another aspect of this application, a data processing device for generating a face image is provided, including: a segmentation apparatus, configured to: obtain M first image blocks corresponding to facial features from an inputted first face image, and obtain N second image blocks corresponding to facial features from an inputted second face image; a first transform apparatus, configured to transform the M first image blocks and the N second image blocks to a feature space to generate M first feature blocks and N second feature blocks; a selection apparatus, configured to select some first feature blocks and some second feature blocks according to a specified control vector; a first compositing apparatus, configured to generate a first composite feature map based on at least the selected some first feature blocks and some second feature blocks; and a first inverse transform apparatus, configured to inversely transform the first composite feature map back to an image space to generate a third face image.

According to yet another aspect of this application, a non-transitory computer-readable recording medium is provided, storing a computer program, a processor, when executing the computer program, performing the data processing method for generating a face image in the foregoing embodiments.

According to yet another aspect of this application, a computer device is provided. The computer device includes memory and one or more processors, the memory being configured to store a computer program, and the processors being configured to execute the computer program to implement the data processing method for generating a face image in the foregoing embodiments.

DESCRIPTION OF EMBODIMENTS

Figure 1:
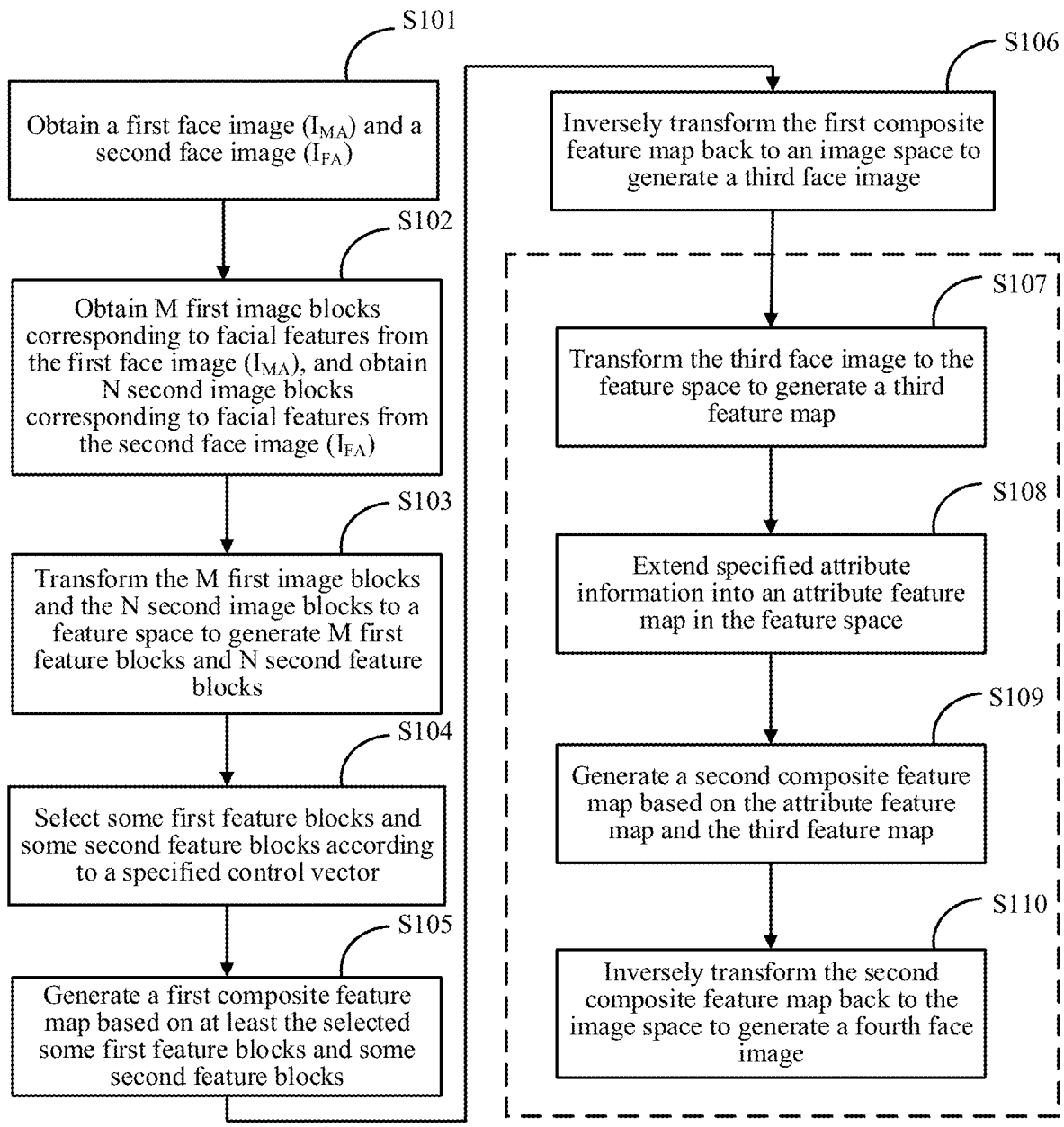
FIG. 1 is a flowchart of a process of a data processing method for generating a face image according to an embodiment of this application.

The implementations of this application are described below with reference to the accompanying drawings. The following description, with reference to the accompanying drawings, is provided to help understanding of exemplary implementations of this application defined by the claims and equivalents thereof. The description includes specific details for helping understanding, but the specific details are only exemplary. Therefore, a person skilled in the art knows that, various changes and modifications may be made to the implementations described herein without departing from the scope and spirit of this application. In addition, to make this specification clearer and more concise, detailed descriptions of functions and constructions well known in the art are omitted.

As described in the Background section, because a general-purpose processing network is used in the face generation solution according to the related art, a difference between an outputted face image and a real face image is relatively large. In addition, in the face generation solution according to the related art, a real face database needs to be collected and built for training the encoding network and the decoding network in the general-purpose processing network, to provide supervision information for an outputted composite face image. For example, in an application scenario of child faces prediction, it is necessary to collect and build a face database with a relationship between a father/mother and a child. A real child face image is used as supervision information of a composite child face image outputted by the processing network based on a father or mother face image, to adjust parameters of the processing network, so that the trained processing network can output a composite face image that is like an inputted face image and similar to a real image. However, in practice, it requires relatively high costs to collect and build such a database.

Therefore, in some embodiments of this application, an inheritance network specialized for compositing a face image is provided, which, compared with the general-purpose processing network, can output a composite face image closer to a real image, and accurately control facial features in two inputted face images that the composite face image inherits. Moreover, the embodiments of this application further provide an attribute enhancement network, which can adjust, based on the composite face image outputted by the inheritance network, attributes (such as an age and a gender) of a composite face image within a relatively large range. In addition, in the embodiments of this application, a method of training an inheritance network and an attribute enhancement network without a face database with a relationship between a father/mother and a child is provided. In the training process of the inheritance network and the attribute enhancement network according to the embodiments of this application, the processing networks may be trained by directly using any existing face database without building a face database with a relationship between a father/mother and a child.

To better understand this application, specific meanings of terms to be mentioned in the following are defined as follows:

First face image is an image inputted to the inheritance network in application mode, and is represented as $I_{MA}$.

Second face image is another image inputted to the inheritance network in application mode, and is represented as $I_{FA}$.

Third face image is an image outputted by the inheritance network in application mode, and is represented as $I_{o1}$.

Fourth face image is a further image outputted by the inheritance network in application mode, and is represented as $I_{o2}$.

Fifth face image is an image inputted to the inheritance network in training mode, and is represented as $I_M$.

Sixth face image is another image inputted to the inheritance network in training mode, and is represented as $I_F$.

Seventh face image is an image outputted by the inheritance network in training mode, and is represented as $I'_M$, and the fifth face image $I_M$ is used as a supervision image.

Eighth face image is an image outputted by the inheritance network in training mode, and is represented as $I'_F$ and the sixth face image $I_F$ is used as a supervision image.

Ninth face image is an image outputted by the attribute enhancement network in training mode, and is represented as $\bar{I}_M$, and the seventh face image $I'_M$ is used as a supervision image.

Tenth face image is an image outputted by the attribute enhancement network in training mode, and is represented as $\bar{I}_F$, and the eighth face image $I'_F$ is used as a supervision image.

Next, the embodiments according to this application are described in detail with reference to the accompanying drawings. First, a data processing method for generating a face image according to an embodiment of this application is described with referring to FIG. 1. The method is performed by a server. As shown in FIG. 1, the data processing method includes the following steps:

In step S101, a first face image ($I_{MA}$) and a second face image ($I_{FA}$) are obtained.

Then, in step S102, M first image blocks corresponding to facial features are obtained from the first face image ($I_{MA}$), and N second image blocks corresponding to facial features are obtained from the second face image ($I_{FA}$). Herein, the facial features may be organ (such as eyebrows, eyes, a nose, a mouth, and a facial outline), tissue, or local features (such as, features on a forehead and skin), or the like. The M first image blocks correspond to different facial features respectively, and similarly, the N second image blocks correspond to different facial features respectively. M and N are natural numbers. In some embodiments, M and N are positive integers. In some embodiments, M and N are positive integers greater than one.

For example, the first face image and the second face image may be face images of persons with different genders, for example, a male face image and a female face image. Alternatively, the first face image and the second face image may be face images of persons with the same gender.

In addition, for example, the first face image and the second face image may be real face images shot by a camera. Alternatively, the first face image and the second face image may be composite images generated based on facial feature images selected from an existing facial feature database. Specifically, the first face image may be a composite image that is generated by replacing an original facial feature of a person with a facial feature randomly selected from the facial feature database, and the second face image may be a composite image generated in a similar manner. Alternatively, the first face image may be a composite image generated with all facial features randomly selected from the facial feature database and combined, and the second face image may be a composite image generated in a similar manner.

In another example, the first face image and the second face image may alternatively be cartoon face images. It can be learned that, in this embodiment of this application, types of the first face image and the second face image are not particularly limited. Any two face images that can be used as an input are similarly applicable to the embodiments of this application, and fall within the scope of this application.

For the inputted face image, the facial features may be first positioned through facial calibration, and the face images are then segmented into image blocks corresponding to the facial features. A total quantity of different facial features required for generating a new face image is preset, and is represented as L, L being a natural number. For example, in a possible implementation, the facial features may include a left eye and a left eyebrow, a right eye and a right eyebrow, a nose, a mouth, and a face outline. In this case, the total quantity of different facial features required for generating a new face image is 5. If an inputted face images is a complete frontal image, a quantity of image blocks obtained through segmentation is the same as the total quantity of different facial features. In other words, all required different facial features may be detected from the face image. In this implementation, the inputted face image may be segmented into five image blocks: an image block corresponding to the left eye and the left eyebrow, an image block corresponding to the right eye and the right eyebrow, an image block corresponding to the nose, an image block corresponding to the mouth, and an image block corresponding to the face outline. Certainly, this segmentation is merely an example, and any other segmentation is also possible. For example, the inputted face image may alternatively be segmented into an image block corresponding to the eyes, an image block corresponding to the eyebrows, the image block corresponding to the nose, the image block corresponding to the mouth, and the image block corresponding to the face outline. However, if an inputted face image is a side image at a certain angle, or an inputted face image is an incomplete frontal image, a quantity of image blocks segmented from this face image is less than the total quantity of different facial features required. In other words, some facial features may not be detected from the face image. Because a new face image may be composited in subsequent steps by selecting some (e.g., a subset of, one or more of, etc.) facial features from the first face image and some (e.g., a subset of, one or more of, etc.) facial features from the second face image, it is unnecessary to obtain all the facial features required for generating a new face image from one inputted face image, provided that all the facial features obtained from the two inputted face images may be pieced together to generate a new face image.

In summary, both the quantity M of first image blocks and the quantity N of second image blocks may be equal to the total quantity L of different facial features required for generating a new face image. Alternatively, one of the quantity M of first image blocks and the quantity N of second image blocks may be equal to the total quantity L of different facial features required for generating a new face image, while the other may be less than L. Alternatively, both the quantity M of first image blocks and the quantity N of second image blocks may be less than L, and M and N may or may not be equal.

Next, in step S103, the M first image blocks and the N second image blocks are transformed to a feature space to generate M first feature blocks and N second feature blocks.

The transformation from an image space into the feature space may be implemented by using a transform network, for example, an encoding network. The same encoding network may be provided for image blocks with different facial features. Alternatively, in another possible implementation, due to differences between facial features in appearance, an exclusive feature is obtained for each facial feature. Specifically, an image block corresponding to each facial feature may be provided with an encoding network. For example, a group of encoding networks is provided. An encoding network E1 is used for the image block corresponding to the left eye and the left eyebrow, an encoding network E2 is used for the image block corresponding to the right eye and the right eyebrow, an encoding network E3 is used for the image block corresponding to the nose, an encoding network E4 is used for the image block corresponding to the mouth, and the encoding network E5 is used for the image block corresponding to the face outline. Parameters of the encoding networks E1 to E5 are different from each other. The M first image blocks are transformed to the feature space respectively through the corresponding encoding networks E1 to E5, and similarly, the N second image blocks are transformed to the feature space respectively through the corresponding encoding networks E1 to E5. For example, a two-dimensional image block may be transformed into a three-dimensional feature block including a length, a width, and a height through the encoding network.

Then, in step S104, some (e.g., one or more, at least two, a subset of, etc.) first feature blocks and some e.g., one or more, at least two, a subset of, etc.) second feature blocks are selected according to a specified control vector.

The specified control vector includes L information bits corresponding to the facial features. Herein, a quantity of information bits is the same as the total quantity L of different facial features required for generating a new face image. Moreover, as described above, L is a natural number, $M \le L$, and $N \le L$. For example, when the facial features include the left eye and the left eyebrow, the right eye and the right eyebrow, the nose, the mouth, and the face outline, the control vector includes five information bits, and the five information bits correspond to the left eye and the left eyebrow, the right eye and the right eyebrow, the nose, the mouth, and the face outline respectively. In addition, the specified control vector may be set manually by a user, or may be automatically set at random.

Specifically, the step of selecting some first feature blocks and some second feature blocks according to a specified control vector includes: selecting, when an information bit in the specified control vector is a first value, a feature block of a facial feature corresponding to the information bit from the M first feature blocks, and selecting, when the information bit in the specified control vector is a second value, a feature block of the facial feature corresponding to the information bit from the N second feature blocks. The selection is performed sequentially according to the information bits in the control vector, to obtain L feature blocks. The feature blocks are hybrid feature blocks including some first feature blocks and some second feature blocks.

For example, if the control vector v is 10010, this means that a feature block corresponding to the left eye and the left eyebrow and a feature block corresponding to the mouth are selected from the first feature blocks, and a feature block corresponding to the right eye and the right eyebrow, a feature block corresponding to the nose, and a feature block corresponding to the face outline are selected from the second feature blocks.

Next, in step S105, a first composite feature map is generated based on at least the selected some first feature blocks and some second feature blocks.

In the foregoing example, when the control vector v is 10010, a first composite feature map may be generated based on the feature block corresponding to the left eye and the left eyebrow and the feature block corresponding to the mouth that are in the first feature blocks, and the feature block corresponding to the right eye and the right eyebrow, the feature block corresponding to the nose, and the feature block corresponding to the face outline that are in the second feature blocks. That is, in the feature space, the feature blocks of the facial features from different sources are recombined into a new composite feature map including the facial features.

In addition, attributes (for example, an age, a gender, etc.) of an outputted third face image may be controlled. For example, the gender of the third face image expected to be outputted may be specified. In addition, there may be a relatively large difference between attribute information of the inputted first face image and second face image. Specifically, an age of the first face image may greatly differ from an age of the second face image. For example, the first face image is at an age of 20 years old, while the second face image is at an age of 60 years old. To control the attributes of the outputted third face image and prevent disharmony of a finally generated third face image, in another possible implementation, an attribute feature is further superimposed based on the selected feature blocks. For example, if the third face image expected to be outputted is a female face image, an attribute feature of a female may be further superimposed, to remove male features such as a beard. Alternatively, if the ages of the inputted face images are expected to be balanced, an attribute feature of an average age (which may be 40 years old in the foregoing example) may be further superimposed.

Specifically, the step of generating a first composite feature map based on at least the selected some first feature blocks and some second feature blocks may include the following steps. First, specified attribute information is extended into an attribute feature block in the feature space. When the two-dimensional image block is transformed into the three-dimensional feature block including a length, a width, and a height, the attribute information may be extended into a feature block having the same length and width as but a different height from the feature block. Then, the first composite feature map is generated based on the selected some first feature blocks and some second feature blocks and the attribute feature block.

Finally, in step S106, the first composite feature map is inversely transformed back to an image space to generate a third face image (Li). The inverse transformation from the feature space to the image space may be implemented by using an inverse transform network, for example, a decoding network D.

It may be considered that, an inheritance network generates the third face image based on the M first image blocks and the N second image blocks. The inheritance network may include the encoding networks E1 to E5 and the decoding network D, and may be implemented by using various neural networks. If the inheritance network is represented as a function $f_{inh}$, an input of the function includes the first face image $I_{MA}$, the second face image $I_{FA}$, and a control vector v, and an output is the third face image 101. A specific formula is as follows:

$$I_{o1} = f_{inh}(I_{MA}, I_{FA}, v) \tag{1}$$

Alternatively, when the attribute feature is added, the input of the function further includes an age ($y_a$) and a gender ($y_g$) of the third face image that are expected to be outputted. A specific formula is as follows:

$$I_{o1} = f_{inh}(I_{MA}, I_{FA}, v, y_a, y_g) \tag{2}$$

Figure 2:
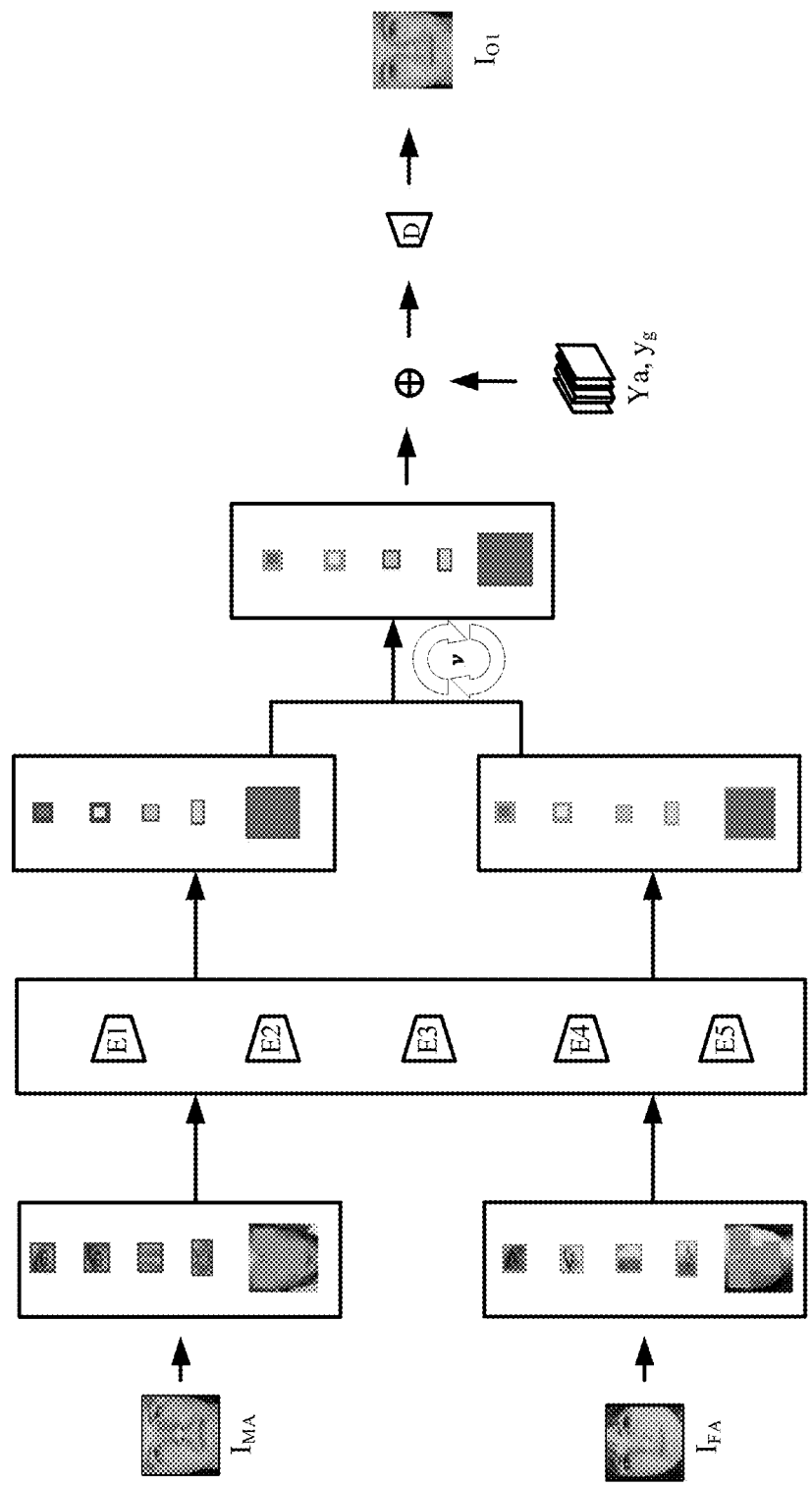
FIG. 2 is a schematic diagram of a data stream of an inheritance network according to an embodiment of this application.

FIG. 2 is a diagram of a data stream of an inheritance network according to an embodiment of this application. As shown in FIG. 2, the image blocks corresponding to the facial features are segmented from the first face image $I_{MA}$ and the second face image $I_{FA}$ as input sources and then transformed into feature blocks in the feature space through the group of encoding networks E1 to E5, and feature blocks are selected and exchanged according to the control vector v and then spliced with an attribute feature block, which are finally transformed back to the image space through the decoding network D, to generate the third face image $I_{o1}$.

The third face image is a composite face image that inherits some facial features in the first face image and some facial features in the second face image. When the first face image and the second face image are face images of two persons with different genders, the generated third face image may be a child face image on the assumption that the two persons are parents. When the first face image and the second face image are face images of two persons with the same gender, the generated third face image may be a hypothetical face image composited by gathering facial feature advantages of the two persons. When the first face image and the second face image are composite images generated by piecing facial features of a plurality of persons together, a face image of a specified person may be inferred from the generated third face image. This is especially important in witnesses' identification in criminal investigation. For example, after the witness selects facial features similar to those of a suspect from the facial feature database, the facial features are combined to generate a composite face image with low quality and unlike a real image. By using the composite face image as a first face image, arbitrarily selecting a second face image, and setting a specified control vector to 11111 (that is, all facial feature images are selected from the first face image), a third face image similar to a real image may be outputted, to help determine the suspect.

In the data processing method for generating a face image according to the embodiments of this application, with reference to the processing steps in FIG. 1, it can be learned that, the third face image that inherits some facial features in the first face image and some facial features in the second face image may be generated through segmentation of facial feature images and recombination in the feature space. Compared with the solution of using a general-purpose processing network in the related art, it can ensure the similarity between the outputted third face image and the face images as input sources, while the outputted third face image is close to a real image. In other words, when the third face image is viewed by a user, it is difficult to distinguish whether the image is a real image or a composite image.

Figure 3:
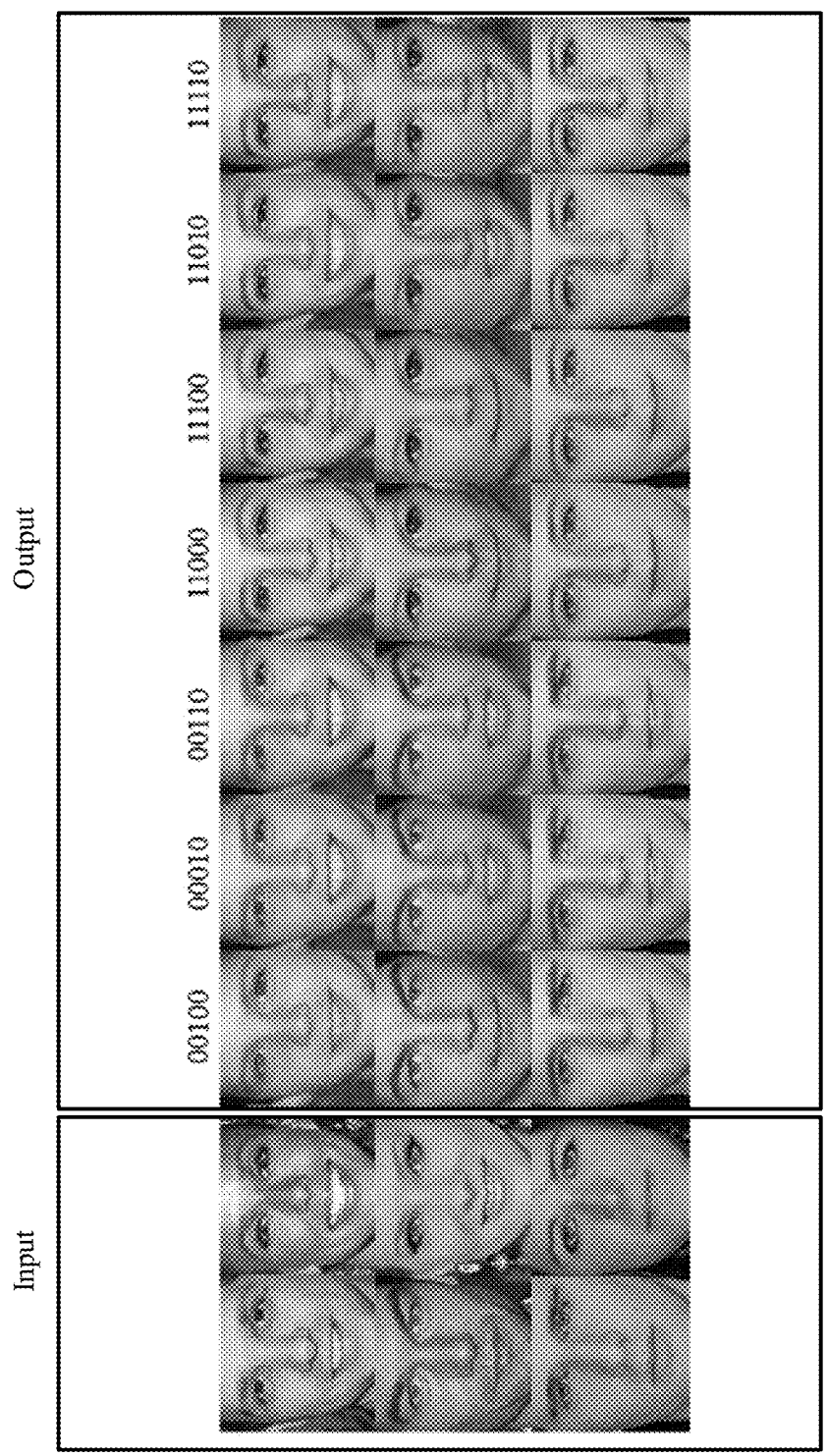
FIG. 3 shows face image generation results based on different control vectors according to an embodiment of this application.

In addition, by setting the control vector, facial features in the two inputted face images that the third face image inherits can be precisely controlled. FIG. 3 shows face image generation results based on different control vectors. It can be learned from FIG. 3 that, by setting different control vectors, an inheritance relationship between facial parts in the generated third face image and the two face images as the input sources can be precisely controlled.

Figure 4:
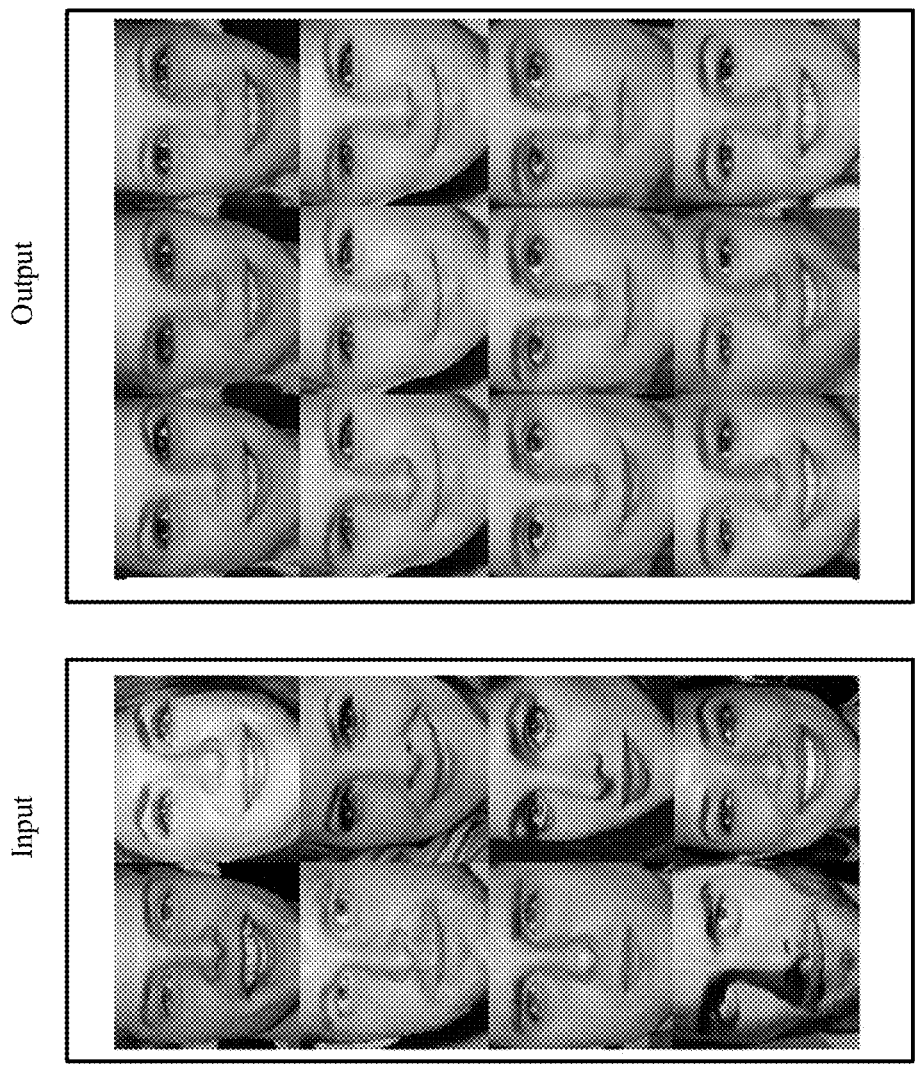
FIG. 4 shows a face image generation result when a random factor is added to an inputted face image according to an embodiment of this application.

FIG. 4 shows a face image generation result when a random factor is added to an inputted face image, that is, as described above, a face image generation result generated when an inputted face image is a composite image that is generated by replacing an original facial feature of a person with a facial feature randomly selected from the facial feature database. In FIG. 4, rows from top to bottom show generation results when random factors are added to the eyes and the eyebrows, the nose, the mouth, and the face outline respectively.

In addition, through superimposition of the attribute feature block in the feature space, the attributes of the third face image may be specified, and the harmony and naturalness of the third face image can be further improved.

The main objective of the inheritance network is to output a third face image that is similar to the first face image and the second face image in the facial features. Therefore, the superimposition of the attribute feature block included therein is fine-tuning on the premise of ensuring the similarity. In other words, the third face image outputted by the inheritance network approximates the first face image and the second face image as the input sources with respect to attributes such as an age.

To adjust the attributes of the outputted face image within a larger range, in another possible implementation, referring to FIG. 1 again, after step S106, the method may further include the following steps.

In step S107, the third face image is transformed to the feature space to generate a third feature map. For example, the transformation from the image space into the feature space may be implemented by using an encoding network E0. Certainly, parameters of the encoding network E0 herein are different from the parameters of the encoding networks E1 to E5.

Then, in step S108, specified attribute information is extended into an attribute feature map in the feature space. For example, in step S107, when a two-dimensional image is transformed into a three-dimensional feature map including a length, a width, and a height, the attribute information may be extended into a feature map having the same length and width as but a different height from the three-dimensional feature map.

Next, in step S109, a second composite feature map is generated based on the attribute feature map and the third feature map.

Finally, in step S110, the second composite feature map is inversely transformed back to the image space to generate a fourth face image. For example, the inverse transformation from the feature space into the image space may be implemented by using a decoding network DO. Herein, parameters of the decoding network DO are also different from parameters of the decoding network D mentioned in step S105.

Step S107 to step S110 are optional, and therefore are shown in a dashed-line box in FIG. 1.

It may be considered that an attribute enhancement network generates the fourth face image based on the third face image. The attribute enhancement network may include the encoding network E0 and the decoding network DO, and may be implemented by using various neural networks. If the attribute enhancement network is represented as a function $f_{att}$, an input of the function includes the third face image $I_{o1}$ and an age ($y_a$) and a gender ($y_g$) of the fourth face image that are expected to be outputted, and an output is the fourth face image $I_{o2}$. A specific formula is as follows:

$$I_{o2} = f_{att}(I_{o1}, y_a, y_g) \quad (3)$$

Figure 5:
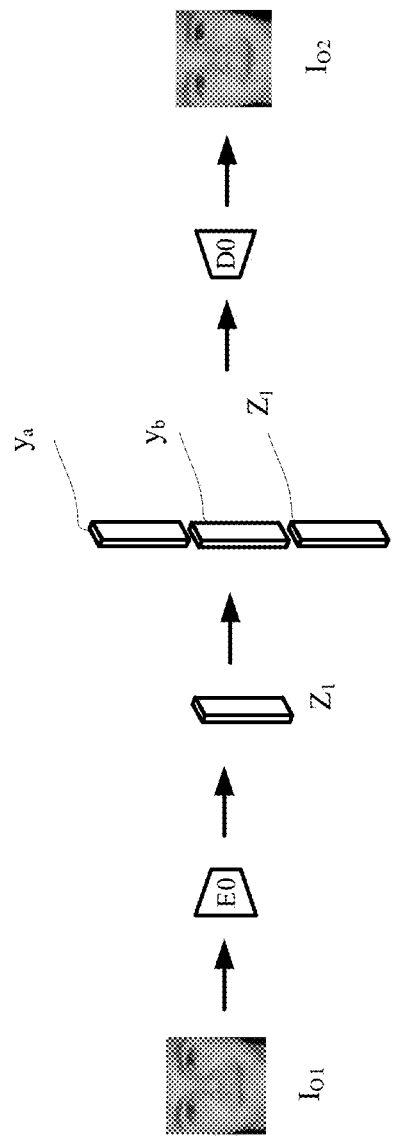
FIG. 5 is a schematic diagram of a data stream of an attribute enhancement network according to an embodiment of this application.

FIG. 5 is a diagram of a data stream of an attribute enhancement network according to an embodiment of this application. As shown in FIG. 5, the third face image Li is transformed into a third feature map $Z_1$ in the feature space through the encoding network E0, and $Z_1$ is then spliced with attribute information $y_a$ and $y_g$ in the feature space, which are inversely transformed back to the image space through the decoding network DO, to obtain the fourth face image $I_{o2}$.

Compared with the third face image, the fourth face image may have a great change in attributes. For example, a fourth face image at an age of 5 years old may be outputted based on an inputted third face image at an age of 20 years old.

Figure 6:
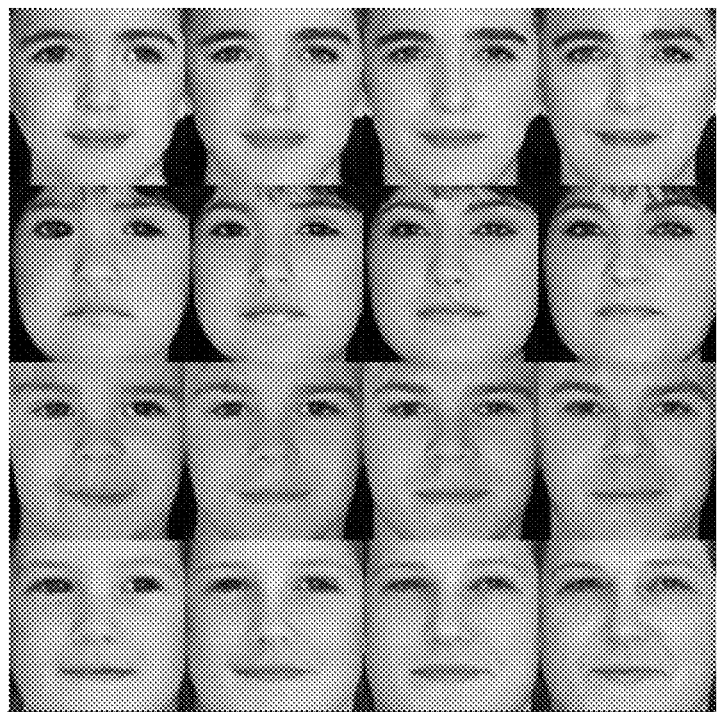
FIG. 6 shows face images at different ages generated based on a specified control vector.

FIG. 6 shows face images at different ages generated based on a specified control vector. It can be learned from FIG. 6 that, through the inheritance network and the attribute enhancement network, face images at different ages may be generated, and a face at each age is obviously different.

Figure 7:
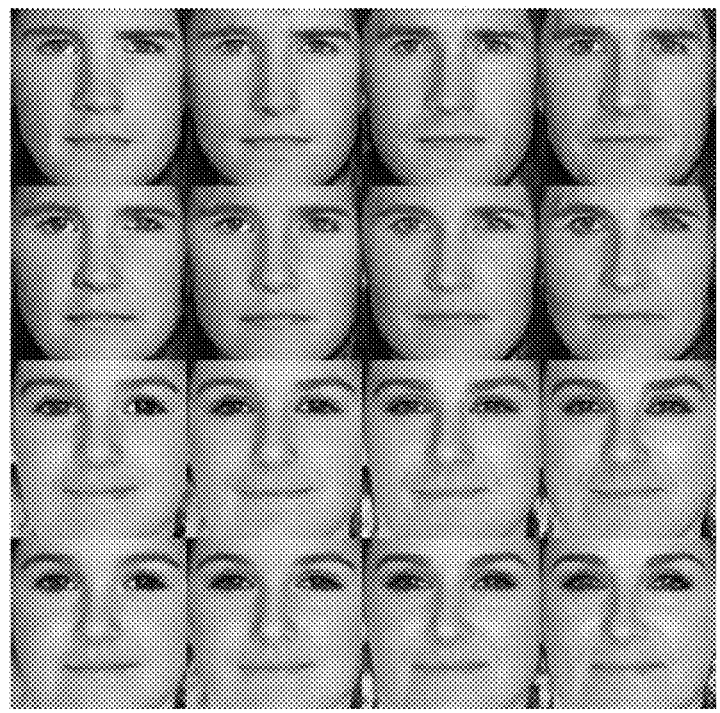
FIG. 7 shows face images with different ages and different genders generated based on a specified control vector.

FIG. 7 shows face images with different ages and different genders generated based on a specified control vector. It can be learned from FIG. 7 that, through the inheritance network and the attribute enhancement network, even based on the same control vector, a difference between generated face images due to a gender and an age can still be reflected in facial parts, for example, cheeks, eyebrows, nasolabial folds, and a lip color.

Figure 8:
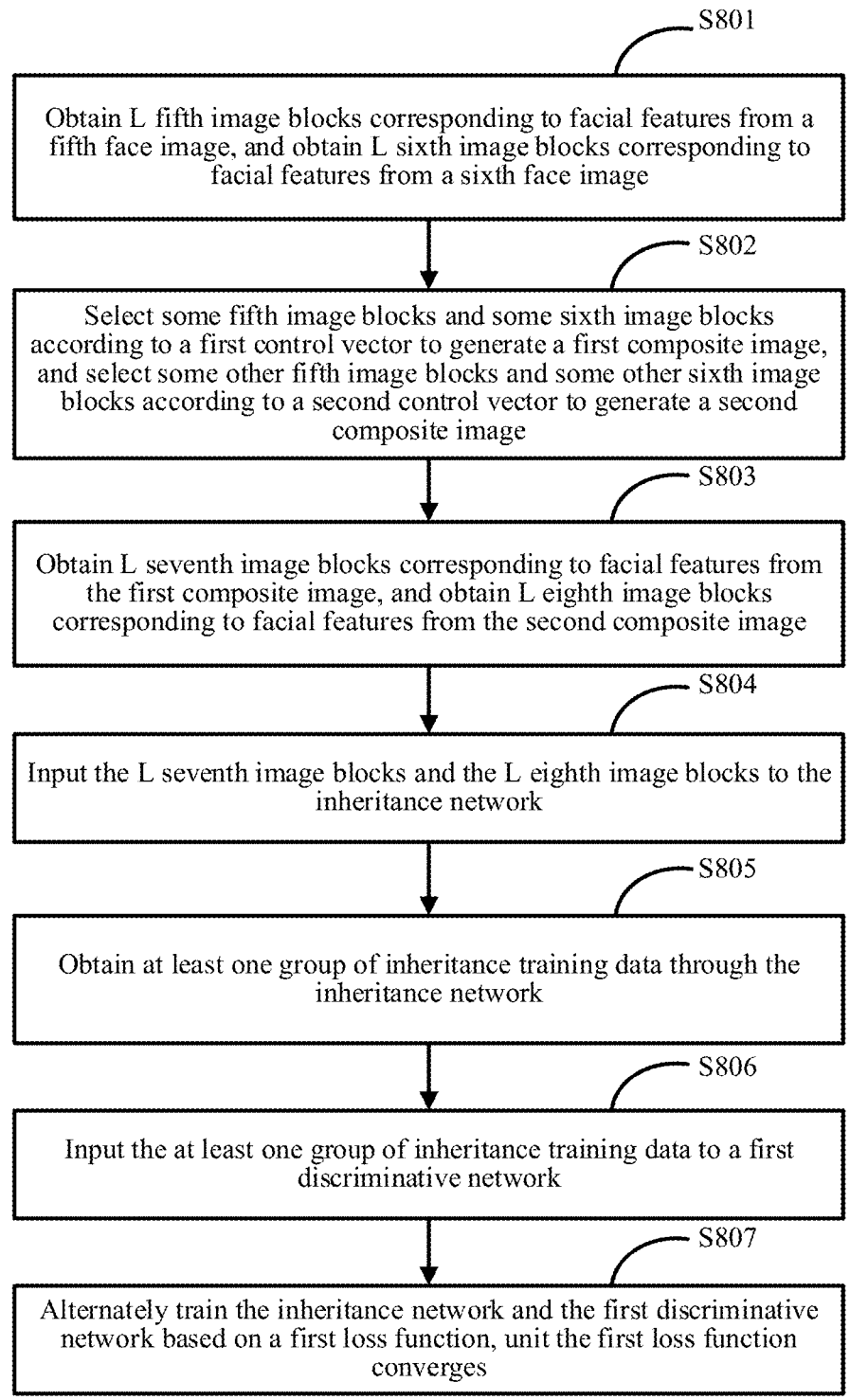
FIG. 8 is a flowchart of a training process of an inheritance network according to an embodiment of this application.

A specific process of the data processing method for generating a face image according to the embodiments of this application is described above in detail with reference to FIG. 1 to FIG. 7. The data processing method is implemented by using the inheritance network or the inheritance network and the attribute enhancement network. The data processing method is processing performed in an application process of the inheritance network and the attribute enhancement network. As described above, the inheritance network and the attribute enhancement network may include an encoding network and a decoding network, and both the encoding network and the decoding network include a plurality of to-be-determined parameters. The parameters are determined through a training process, to construct the inheritance network and the attribute enhancement network. In this way, the inheritance network and the attribute enhancement network can implement the function of generating a face image. In other words, before the application of the inheritance network and the attribute enhancement network, first, the inheritance network and the attribute enhancement network need to be trained. Next, the training process of the inheritance network is first described with reference to FIG. 8. The inheritance network may be obtained by performing the following training steps shown in FIG. 8.

To distinguish from the first to fourth face images in the foregoing application process, face images involved in the training process are defined as fifth to tenth face images in the following.

First, in step S801, L fifth image blocks corresponding to facial features are obtained from a fifth face image ($I_M$), and L sixth image blocks corresponding to facial features are obtained from a sixth face image ($I_F$).

In the foregoing application process, because only one new face image needs to be generated based on the two face images as the input sources, L or less image blocks corresponding to the facial features may be obtained from the two inputted face images, L being the total quantity of different facial features required for generating a new face image, provided that all the facial features obtained from the two inputted face images may be pieced together to generate a new face image. However, unlike the foregoing application process, in the training process, because two new face images need to be generated based on the two face images as the input sources, quantities of image blocks obtained from the fifth face image and the sixth face image as the input sources are both L. As described above, L is the total quantity of different facial features required for generating a new face image.

Then, in step S802, some fifth image blocks and some sixth image blocks are selected according to a first control vector $v_1$ to generate a first composite image ($\hat{I}_M$), and some other fifth image blocks and some other sixth image blocks are selected according to a second control vector $v_2$ to generate a second composite image ($\hat{I}_F$).

Assuming that a function corresponding to a facial feature exchange is $f_{syn}$, a compositing process of the facial feature exchange may be represented by using the following formula:

$$\begin{cases} \hat{I}_M = f_{syn}(I_M, I_F, v_1) \\ \hat{I}_F = f_{syn}(I_M, I_F, v_2) \end{cases} \quad (4)$$

To ensure a subsequent training effect, the composite image after the facial feature exchange is further fused by using a color correction method, to avoid inconsistent color blocks in the composite image. In the foregoing application process, it is also mentioned that the first face image and the second face image may be composite images generated based on facial feature images selected from the existing facial feature database. However, in the application process, because the inheritance network has been trained, color correction processing may not be performed on the composite images.

Next, in step S803, L seventh image blocks corresponding to facial features are obtained from the first composite image ($\hat{I}_M$), and L eighth image blocks corresponding to facial features are obtained from the second composite image ($\hat{I}_F$).

In step S804, the L seventh image blocks and the L eighth image blocks are inputted to the inheritance network.

Then, in step S805, through the inheritance network, a seventh face image ($I'_M$) generated based on the some seventh image blocks and the some eighth image blocks that are selected according to the first control vector is outputted, and an eighth face image ($I'_F$) generated based on the some other seventh image blocks and the some other eighth image blocks that are selected according to the second control vector is outputted, the fifth face image being a supervision image for providing supervision information for the seventh face image, the sixth face image being a supervision image for providing supervision information for the eighth face image, and the fifth face image to the eighth face image being used as a group of inheritance training data.

Assuming that a function corresponding to the inheritance network is $f_{inh}$, a generation process of the inheritance network may be represented by using the following formula:

$$\begin{cases} I'_M = f_{inh}(\hat{I}_M, \hat{I}_F, v_1, y_a^M, y_g^M) \\ I'_F = f_{inh}(\hat{I}_M, \hat{I}_F, v_2, y_a^F, y_g^F) \end{cases} \quad (5)$$

where $y_a^M$ and $y_g'^M$ represent an attribute and a gender of the fifth face image respectively, and $y_a^F$ and $y_g^F$ represent an attribute and a gender of the sixth face image respectively. In the training process, the attribute of the face image expected to be outputted is set to be the same as the attribute of the face image as the input source, to facilitate a subsequent calculation of the loss function.

It can be learned from the foregoing steps that, compared with the application process of the inheritance network, the training process of the inheritance network differs in that a facial feature exchange is performed in advance before the face images as the input sources are inputted to the inheritance network. The objective of the exchange is to provide supervision information for a face image outputted by the inheritance network.

Specifically, if a facial feature exchange is first performed by using a control vector before the fifth face image and the sixth face image as the input sources are provided to the inheritance network, and the composite images after the facial feature exchange are provided to the inheritance network, the original fifth face image or sixth face image can be obtained by performing another facial feature exchange by using the same control vector if the parameters of the inheritance network are set accurately.

Figure 9:
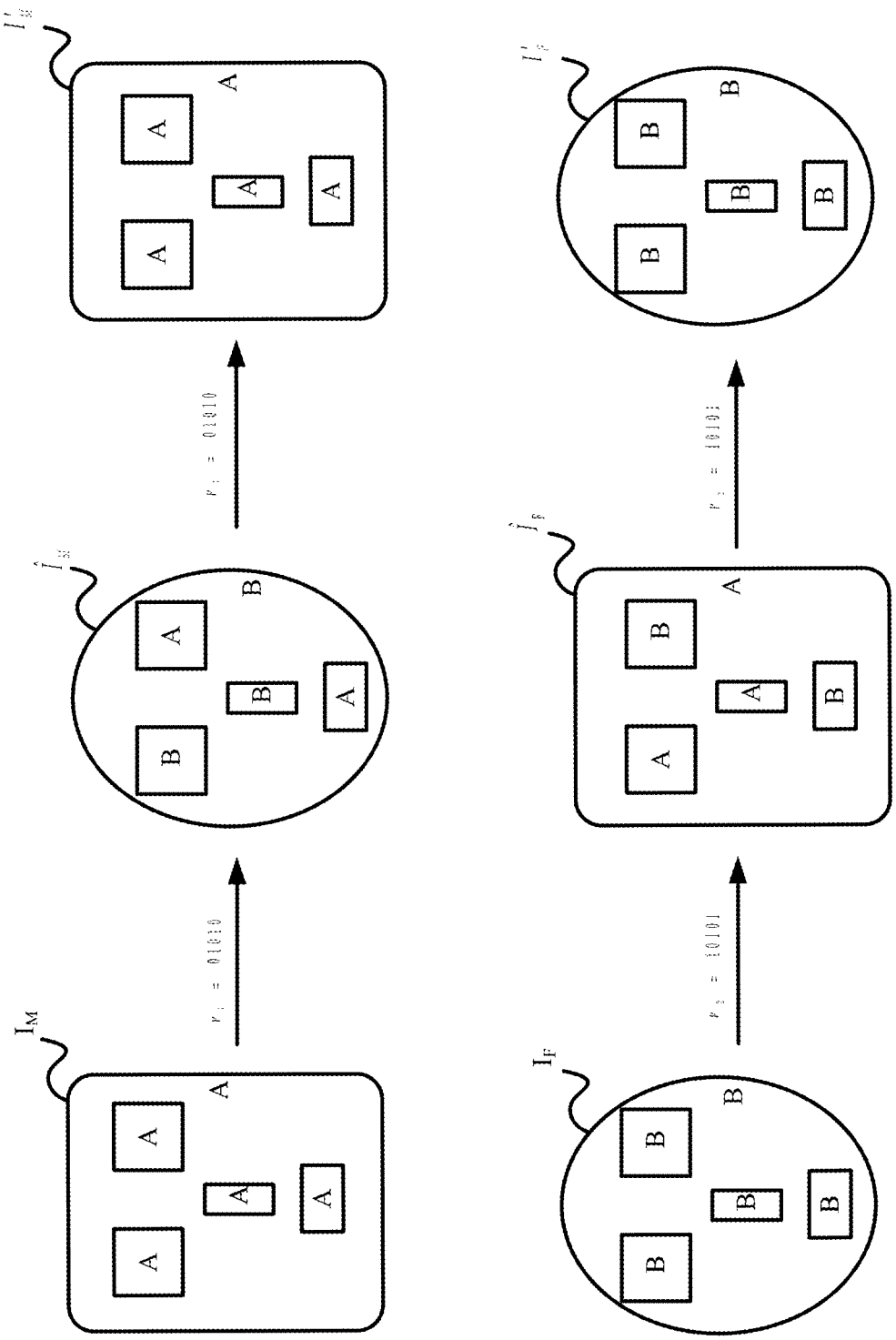
FIG. 9 is a schematic diagram of a process of two facial feature exchanges in a training process of an inheritance network.

For ease of understanding, FIG. 9 shows a schematic process of two facial feature exchanges in a training process of an inheritance network. In FIG. 9, the image blocks of the facial features in the fifth face image ($I_M$) as the input source is represented by a letter A, and the image blocks of the facial features in the sixth face image ($I_F$) as the input source is represented by a letter B. For the fifth face image ($I_M$), if one facial feature exchange is performed by using a first control vector $v_1=01010$, and another facial feature exchange is then performed by using the same first control vector $v_1=01010$, an image the same as the original fifth face image ($I_M$) is obtained. Similarly, for the sixth face image ($I_F$), if one facial feature exchange is performed by using a second control vector $v_2=10101$, and another facial feature exchange is then performed by using the same second control vector $v_2=10101$, an image the same as the original sixth face image ($I_F$) is obtained. Herein, the first control vector $v_1$ and the second control vector $v_2$ need to be opposite to each other.

Therefore, by using the fifth face image ($I_M$) as the supervision image of the seventh face image ($I'_M$) outputted by the inheritance network and using the sixth face image ($I_F$) as the supervision image of the eighth face image ($I'_F$) outputted by the inheritance network, the training process of the inheritance network may be completed by directly using any existing face database without building a face database with a relationship between a father/mother and a child.

In the training process of the inheritance network according to the embodiments of this application, a generative adversarial network (GAN) is used for learning. The GAN includes a generation network and a discriminative network, and data distribution is learned in a new manner of gaming between the generation network and the discriminative network. The objective of the generation network is to learn real data distribution as much as possible, while the objective of the discriminative network is to correctly discriminate as much as possible whether inputted data comes from real data or from the generation network. In the training process, the generation network and the discriminative network need to be optimized continuously, to improve the generation capacity and the discriminative capability respectively.

The inheritance network may be regarded as the generation network herein. In addition, a discriminative network, for example, a first discriminative network, needs to be provided for the image outputted by the inheritance network, to determine whether the image inputted to the first discriminative network is true or false. The true means that the outputted face image is a real image. The false means that the outputted face image is an image outputted by the inheritance network.

Therefore, next, in step S806, the at least one group of inheritance training data is inputted to the first discriminative network, the first discriminative network being configured to output, when an image is inputted to the first discriminative network, a value of a probability that the image is a real image.

Finally, in step S807, the inheritance network and the first discriminative network are alternately trained based on a first loss function, unit the first loss function converges.

Figure 10:
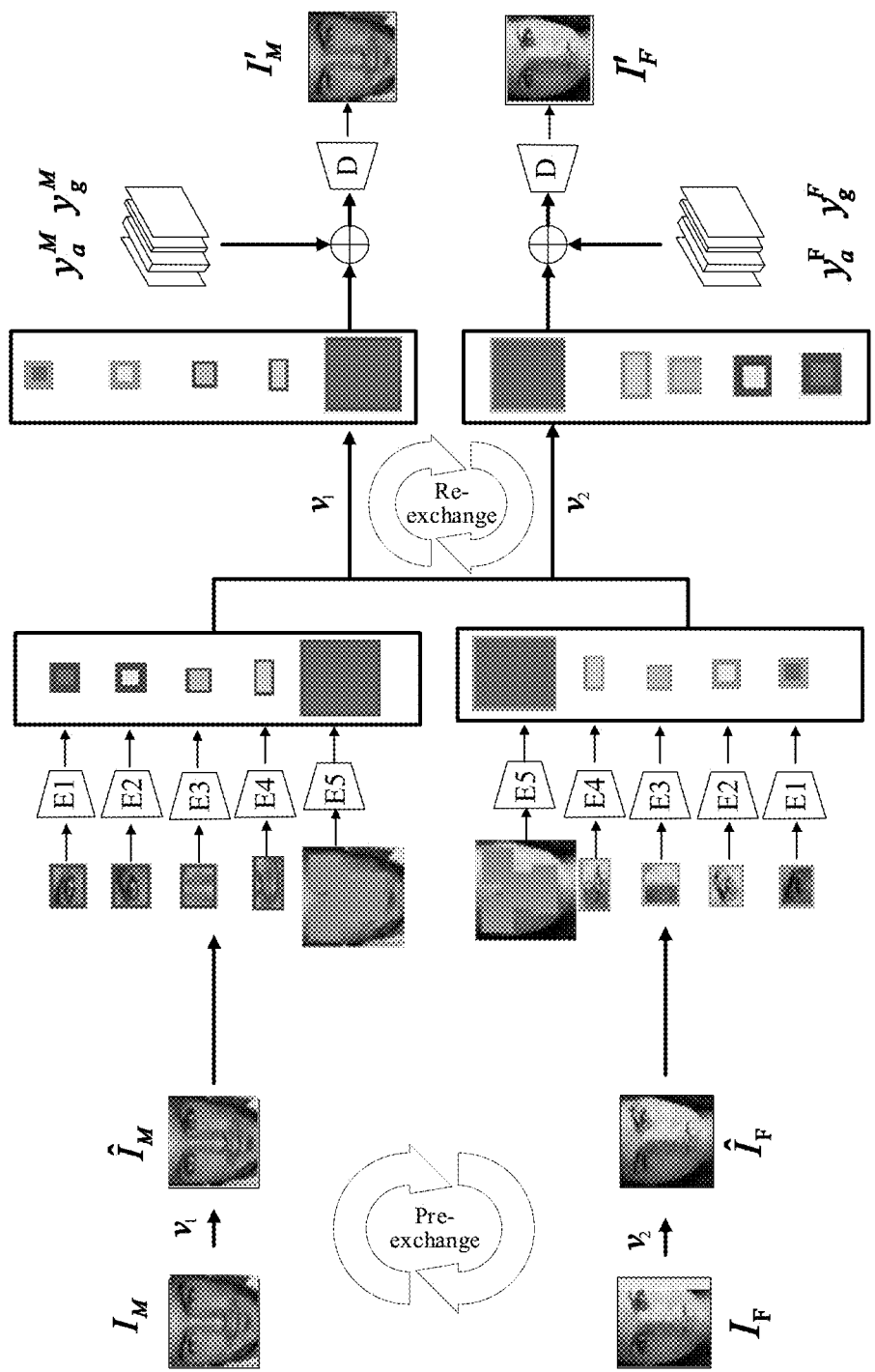
FIG. 10 is a schematic diagram of a data stream in a training process of an inheritance network according to an embodiment of this application.

FIG. 10 is a diagram of a data stream in a training process of an inheritance network according to an embodiment of this application. In the training process, as described above, because the two face images as the input source are used as supervision images of two face images outputted by the inheritance network respectively, two channels of outputs of the inheritance network are both shown in FIG. 10 for ease of comparison. Actually, as described above with reference to FIG. 2, each time two face images are provided as an input to the inheritance network, only one face image is outputted.

As shown in FIG. 10, the seventh face image $I'_M$ is obtained after two exchanges are performed on the fifth face image $I_M$ by using the same control vector $v_1$, and $I_M$ is used as the supervision image of $I'_M$. Similarly, the eighth face image $I'_F$ is obtained after two exchanges are performed on the sixth face image $I_F$ by using the same control vector $v_2$, and $I_F$ is used as the supervision image of $I'_F$.

In a possible implementation, the first loss function is determined based on the probability value outputted by the first discriminative network for the at least one group of inheritance training data and pixel differences between face images and corresponding supervision images in the at least one group of inheritance training data.

Specifically, the first loss function includes a sum of two parts: an adversarial loss and a pixel loss. The adversarial loss $L_{inh}^{adv}$ makes distribution of a face image generated by the inheritance network closer to that of a real image, and may be calculated by using the following formula:

$$L_{inh}^{adv} = \sum_{s \in \{M,F\}} \{E_{I'_s \sim p(I'_s)}[D_I(I'_s)] - E_{I_s \sim p_{data}(I_s)}[D_I(I_s)]\} \quad (6)$$

where $D_I$ represents the first discriminative network, $D_I(I_s')$ is an output (a probability value) of the first discriminative network when an image outputted by the inheritance network is inputted to the first discriminative network, and $D_I(I_s)$ is an output (a probability value) of the first discriminative network when a real image is inputted to the first discriminative network. $E_{I_s' \sim p(I_s')}[D_I(I_s')]$ represents an average value outputted by the first discriminative network when a face image $I_s'$ is inputted, $I_s'$ being a face image outputted by the inheritance network. $E_{I_s' \sim p_{data}(I_s)}[D_I(I_s)]$ represents an average value outputted by the first discriminative network when a face image $I_s$ is inputted, $I_s$ being a face image from a real face database.

In addition, in another possible implementation, to make the first loss function more stable, a noise component may be added based on a Wasserstein GAN (WGAN) framework. A specific formula is as follows:

$$L_{inh}^{adv} = \sum_{s \in \{M,F\}} \{E_{I'_s \sim p(I'_s)}[D_I(I'_s)] - \\ E_{I_s \sim p_{data}(I_s)}[D_I(I_s)] + \lambda_{gp} E_{\tilde{I}_s \sim p_{data}(\tilde{I}_s)}[(\|\nabla_{\tilde{I}_s} D_I(\tilde{I}_s)\|_2 - 1)^2]\} \quad (7)$$

where $\lambda_{gp}$ is a hyper-parameter of the WGAN, $D_I(\tilde{I}_s)$ is an output of the first discriminative network when noise $\tilde{I}_s$ is inputted to the first discriminative network, and $\|\nabla_{\tilde{I}_s} D_I(\tilde{I}_s)\|_2$ represents a two-norm after a gradient of $D_I(\tilde{I}_s)$ is obtained.

The pixel loss $L_{inh}^{pix}$ is used for ensuring the similarity between the face image generated by the inheritance network and the face image as the input source, and is represented by a pixel loss between the face image generated by the inheritance network and the real face image, that is, a sum of absolute values of differences between pixel values of the two images. A specific formula is as follows:

$$L_{inh}^{pix} = \sum_{s \in \{M,F\}} E_{I'_s, I_s}[\|I'_s - I_s\|_2] \quad (8)$$

Therefore, the first loss function may be represented as follows:

$$L_{inh} = \lambda_{11} L_{inh}^{adv} + \lambda_{12} L_{inh}^{pix} \quad (9)$$

where $\lambda_{11}$ and $\lambda_{12}$ are weight coefficients.

The inheritance network and the first discriminative network are alternately trained based on the first loss function. Specifically, the inheritance network may be first fixed, and the first discriminative network is trained. In this case, a value of the first loss function is expected to be as small as possible. Then, the first discriminative network may be fixed, and the inheritance network is trained. In this case, the value of the first loss function is expected to be as large as possible. After a plurality of rounds of training, when the first loss function has little fluctuation in different inheritance training data, that is, the first loss function converges, the training of the inheritance network is completed.

In another possible implementation, in addition to the adversarial loss and the pixel loss, the first loss function may be further determined based on at least one of the following: differences between attributes of the face images and attributes of the corresponding supervision images in the at least one group of inheritance training data and differences between features of the face images and features of the corresponding supervision images in the at least one group of inheritance training data.

Specifically, the first loss function may further include an attribute loss. The attribute loss is determined according to a difference between the attribute of the face image outputted by the inheritance network and the attribute of the real face image as the input source. Loss functions of the age and the gender may be calculated respectively by using the following formulas:

$$L_{inh}^{age} = \sum_{s \in \{M,F\}} E_{I'_s \sim p(I'_s)}[\|D_a(I'_s) - y_a^s\|_2] \quad (10)$$

$$L_{inh}^{gen} = \sum_{s \in \{M,F\}} E_{I'_s \sim p(I'_s)}[\|D_g(I'_s) - y_g^s\|_2]  \quad (11)$$

where $D_a$ and $D_g$ are networks that discriminate an age and a gender of an image respectively. For example, a regression model of the age and the gender may be pre-trained by using a ResNet, so that when an image $I_s'$ is inputted to the model, age and gender information of the image may be outputted. $D_a(I_s')$ represents an age of the face image ($I_s'$) determined by using $D_a$, and $D_g(I_s')$ represents a gender of the face image ($I_s'$) determined by using $D_g$. $y_a^s$ represents an age of the real face image as the input source, and $y_g^s$ represents a gender of the real face image as the input source.

In addition, the first loss function may further include a perceptual loss. For example, 19 layers of VGG features may be used to calculate the perceptual loss $L_{inh}^{per}$, that is, a distance between a VGG feature of the face image outputted by the inheritance network and a VGG feature of the real face image as the input source. A specific formula is as follows:

$$L_{inh}^{per} = \sum_{s \in \{M,F\}} E_{I'_s,I_s}[\|f_{I_s}^{2,2} - f_{I'_s}^{2,2}\|_2 + \|f_{I_s}^{5,4} - f_{I'_s}^{5,4}\|_2]  \quad (12)$$

where $f_{I_s}^{i,j}$ and $f_{I'_s}^{i,j}$ refer to features of the face images $I_s$ and $I_s'$ in an $i^{th}$ pooling layer and a $j^{th}$ convolutional layer in VGG 19 respectively.

For example, in another possible implementation, the first loss function may alternatively be represented as follows:

$$L_{inh} = \lambda_{11} L_{inh}^{adv} + \lambda_{12} L_{inh}^{pix} + \lambda_{13} L_{inh}^{per} + \lambda_{14} L_{inh}^{age} + \lambda_{15} L_{inh}^{gen}  \quad (13)$$

where $\lambda_{11}$, $\lambda_{12}$, $\lambda_{13}$, $\lambda_{14}$, and $\lambda_{15}$ are different weight coefficients, and may be assigned according to importance of the loss functions.

Next, the training process of the attribute enhancement network is described with reference to FIG. 11. The attribute enhancement network may be obtained by performing the following training steps shown in FIG. 11.

In the training process of the attribute enhancement network according to the embodiments of this application, the GAN is also used for learning.

The attribute enhancement network may be regarded as the generation network herein. In addition, a discriminative network, for example, a second discriminative network, needs to be provided for the image outputted by the attribute enhancement network, to determine whether the image inputted to the first discriminative network is true or false. The true means that the outputted face image is a real image. The false means that the outputted face image is an image outputted by the attribute enhancement network.

Figure 11:
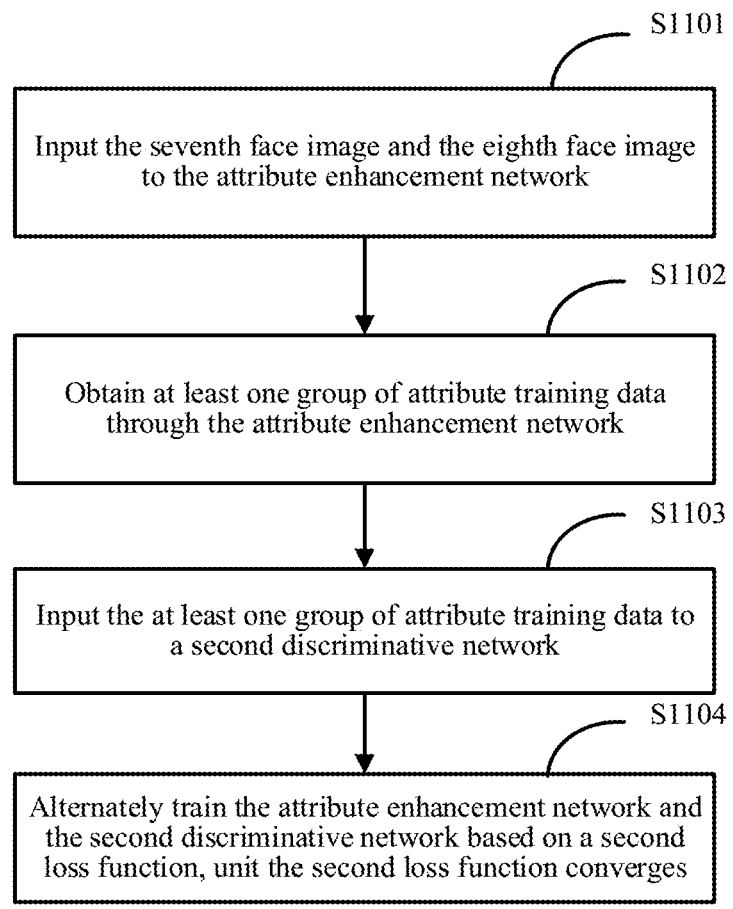
FIG. 11 is a flowchart of a training process of an attribute enhancement network according to an embodiment of this application.

As described above, the fourth face image is generated by inputting the third face image to the attribute enhancement network, and the attribute enhancement network is obtained by performing the following training steps shown in FIG. 11.

First, in step S1101, the seventh face image ($I'_M$) and the eighth face image ($I'_F$) are inputted to the attribute enhancement network.

Then, in step S1102, through the attribute enhancement network, a ninth face image ($\tilde{I}_M$) corresponding to the seventh face image and a tenth face image ($\tilde{I}_F$) corresponding to the eighth face image are outputted, the seventh face image being a supervision image for providing supervision information for the ninth face image, the eighth face image being a supervision image for providing supervision information for the tenth face image, and the seventh face image to the tenth face image being used as a group of attribute training data.

Assuming that a function corresponding to the attribute enhancement network is $f_{att}$, a generation process of the attribute enhancement network may be represented by using the following formula:

$$\begin{cases} \tilde{I}_M = f_{att}(I'_M, I'_F, y_a^M, y_g^M) \\ \tilde{I}_F = f_{att}(I'_M, I'_F, y_a^F, y_g^F) \end{cases} \quad (14)$$

where $y_a^M$ and $y_g^M$ represent an attribute and a gender of the fifth face image respectively, and $y_a^F$ and $y_g^F$ represent an attribute and a gender of the sixth face image respectively. In the training process, the attribute of the face image expected to be outputted is set to be the same as the attribute of the face image as the input source, to facilitate a subsequent calculation of the loss function.

Next, in step S1103, the at least one group of attribute training data is inputted to the second discriminative network, the second discriminative network being configured to output, when an image is inputted to the second discriminative network, a value of a probability that the image is a real image.

Finally, in step S1104, the attribute enhancement network and the second discriminative network are alternately trained based on a second loss function, unit the second loss function converges.

Figure 12:
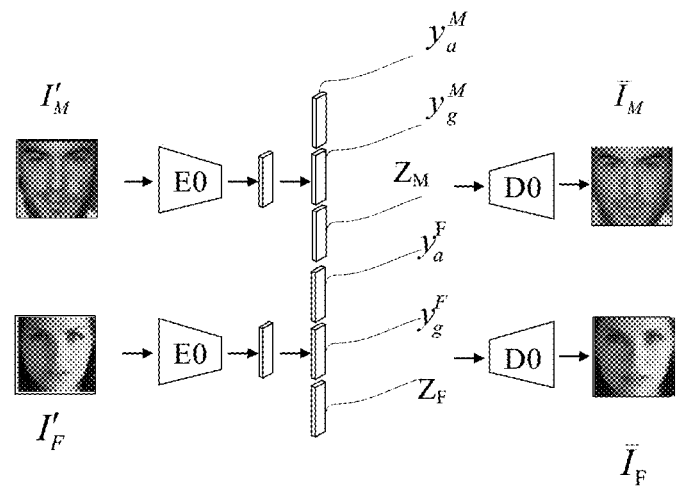
FIG. 12 is a diagram of a data stream in a training process of an attribute enhancement network according to an embodiment of this application.

FIG. 12 is a diagram of a data stream in a training process of an attribute enhancement network according to an embodiment of this application. Similar to FIG. 10, two channels of outputs of the attribute enhancement network are shown in FIG. 12.

As shown in FIG. 12, the seventh face image $I'_M$ and the eighth face image $I'_F$ are inputted to the attribute enhancement network, and are transformed to the feature space to obtain feature maps $Z_M$ and $Z_F$ respectively, the feature maps are spliced with an attribute feature in the feature space, which are inversely transformed to the image space to obtain a ninth face image $\tilde{I}_M$ and a tenth face image $\tilde{I}_F$, and the seventh face image $I'_M$ and the eighth face image $I'_F$ are used as supervision images of the ninth face image $\tilde{I}_M$ and the tenth face image $\tilde{I}_F$ respectively.

In a possible implementation, the second loss function is determined based on the probability value outputted by the second discriminative network for the at least one group of attribute training data and pixel differences between face images and corresponding supervision images in the at least one group of attribute training data.

Specifically, the second loss function includes a sum of two parts: an adversarial loss and a pixel loss. The adversarial loss $L_{inh}^{adv}$ makes distribution of a face image generated by the attribute enhancement network closer to that of a real image, and may be calculated by using the following formula:

$$L_{att}^{adv} = \sum_{s \in \{M,F\}} \{E_{\tilde{I}_s \sim p(\tilde{I}_s)}[\log D_{\tilde{I}}(\tilde{I}_s)] - E_{I_s \sim p_{data}(I_s)}[\log D_{\tilde{I}}(I_s)]\} \quad (15)$$

where $D_{\tilde{I}}$ represents the second discriminative network, $D_{\tilde{I}}(I_s')$ is an output (a probability value) of the second discriminative network when an image outputted by the attribute enhancement network is inputted to the second discriminative network, and $D_{\tilde{T}}(I_s)$ is an output (a probability value) of the second discriminative network when a real image is inputted to the second discriminative network. $E_{\tilde{T}_s\sim p(\tilde{T}_s)}[\log D_{\tilde{T}}(\tilde{T}_s)]$ represents an average value of logarithms outputted by the second discriminative network when a face image $\tilde{I}_s$ is inputted, $\tilde{I}_s$ being a face image outputted by the attribute enhancement network. $E_{\tilde{I}_s\sim p_{data}(I_s)}[\log D_{\tilde{T}}(I_s)]$ represents an average value of logarithms outputted by the second discriminative network when a face image $I_s$ is inputted, $I_s$ being a face image from a real face database.

In addition, in another possible implementation, to make the second loss function more stable, a noise component may be added based on a WGAN framework. A specific formula is as follows:

$$L_{att}^{adv} = \sum_{s \in \{M,F\}} \left\{ E_{\tilde{T}_s \sim p(\tilde{T}_s)}[\log D_{\tilde{T}}(\tilde{T}_s)] - \right.$$
$$\left. E_{I_s \sim p_{data}(I_s)}[\log D_{\tilde{T}}(I_s)] + \lambda_{gp} E_{\tilde{I}_s \sim p_{data}(\tilde{I}_s)}[(\|\nabla_{\tilde{I}_s} D_{\tilde{T}}(\tilde{I}_s)\|_2 - 1)^2] \right\} \quad (16)$$

where $\lambda_{gp}$ is a hyper-parameter of the WGAN, $D_{\tilde{T}}(\tilde{I}_s)$ is an output of the second discriminative network when noise $\tilde{I}_s$ is inputted to the second discriminative network, and $\|\nabla_{\tilde{I}_s} D_{\tilde{T}}(\tilde{I}_s)\|_2$ represents a two-norm after a gradient of $D_{\tilde{T}}(\tilde{I}_s)$ is obtained.

The pixel loss $L_{inh}^{pix}$ is used for ensuring the similarity between the face image generated by the attribute enhancement network and the face image outputted by the inheritance network, and is represented by a pixel loss between the face image generated by the attribute enhancement network and the image outputted by the inheritance network, that is, a sum of absolute values of differences between pixel values of the two images. A specific formula is as follows:

$$L_{att}^{pix} = \sum_{s \in \{M,F\}} E_{I'_s, \tilde{T}_s}[\|I'_s - \tilde{I}_s\|_2] \quad (17)$$

Therefore, the second loss function may be represented as follows:

$$L_{att} = \lambda_{21} L_{att}^{adv} + \lambda_{22} L_{att}^{pix} \quad (18)$$

where $\lambda_{21}$ and $\lambda_{22}$ are weight coefficients.

In another possible implementation, in addition to the adversarial loss and the pixel loss, the second loss function may be further determined based on at least one of the following: differences between attributes of the face images and attributes of the corresponding supervision images in the at least one group of attribute training data and differences between features of the face images and features of the corresponding supervision images in the at least one group of attribute training data.

Specifically, the second loss function may further include an attribute loss. The attribute loss is determined according to a difference between the attribute of the face image outputted by the attribute enhancement network and the attribute of the face image outputted by the inheritance network. Loss functions of the age and the gender may be calculated respectively by using the following formulas:

$$L_{att}^{age} = \sum_{s \in \{M,F\}} E_{\tilde{T}_s \sim p(\tilde{T}_s)}[\|D_a(\tilde{T}_s) - y_a^s\|_2] \quad (19)$$

-continued $$L_{inh}^{gen} = \sum_{s \in \{M,F\}} E_{\tilde{T}_s \sim p(\tilde{T}_s)}[\|D_g(\tilde{T}_s) - y_g^s\|_2] \quad (20)$$

where $D_a$ and $D_g$ are networks that discriminate an age and a gender of an image respectively. For example, a regression model of the age and the gender may be pre-trained by using a ResNet, so that when an image $I_s'$ is inputted to the model, age and gender information of the image may be outputted. $D_a(\tilde{I}_s)$ represents an age of the face image ($\tilde{I}_s$) determined by using $D_a$, and $D_g(\tilde{I}_s)$ represents a gender of the face image ($\tilde{I}_s$) determined by using $D_g$. $y_a^s$ represents an age of the face image as the output of the inheritance network, and $y_g^s$ represents a gender of the face image as the output of the inheritance network. Because the age and the gender of the face image outputted by the inheritance network are the same as the age and the gender of the real face image as the input source, the age and the gender of the real face image may be directly used as $y_a^s$ and $y_g^s$ herein.

In addition, the first loss function may further include a perceptual loss. For example, 19 layers of VGG features may be used to calculate the perceptual loss $L_{att}^{per}$, that is, a distance between a VGG feature of the face image outputted by the attribute enhancement network and a VGG feature of the face image outputted by the inheritance network. A specific formula is as follows:

$$L_{att}^{per} = \sum_{s \in \{M,F\}} E_{I'_s, \tilde{T}_s} [\|f_{\tilde{T}_s}^{2,2} - f_{I'_s}^{2,2}\|_2 + \|f_{\tilde{T}_s}^{5,4} - f_{I'_s}^{5,4}\|_2] \quad (21)$$

where $f_{\tilde{T}_s}^{i,j}$ and $f_{I'_s}^{i,j}$ refer to features of the face images $\tilde{I}_s$ and $I_s'$ in an $i^{th}$ pooling layer and a $j^{th}$ convolutional layer in VGG 19.

For example, in another possible implementation, the second loss function may alternatively be represented as follows:

$$L_{att} = \lambda_{21} L_{att}^{adv} + \lambda_{22} L_{att}^{pix} + \lambda_{23} L_{att}^{per} + \lambda_{24} L_{att}^{age} + \lambda_{25} L_{att}^{gen} \quad (22)$$

where $\lambda_{21}$, $\lambda_{22}$, $\lambda_{23}$, $\lambda_{24}$, and $\lambda_{25}$ are different weight coefficients, and may be assigned according to importance of the loss functions.

The attribute enhancement network and the second discriminative network are alternately trained based on the second loss function. Specifically, the attribute enhancement network may be first fixed, and the second discriminative network is trained. In this case, a value of the second loss function is expected to be as small as possible. Then, the second discriminative network may be fixed, and the attribute enhancement network is trained. In this case, the value of the second loss function is expected to be as large as possible. After a plurality of rounds of training, when the second loss function has little fluctuation in different attribute training data, that is, the second loss function converges, the training of the attribute enhancement network is completed.

Although an attribute (for example, an age) of an original inputted face image may be greatly changed in the application process of the attribute enhancement network, to provide supervision information, an attribute the same as that of the originally inputted face image is selected in the training process of the attribute enhancement network.

The training processes of the inheritance network and the attribute enhancement network are separately described above. In another possible implementation, in addition to the separate training of the inheritance network and the attribute enhancement network, joint training may be further performed on the two networks, to find a global optimal solution.

Specifically, the inheritance network and the attribute enhancement network are further optimized by performing the following joint training operations: determining a total loss function based on the first loss function and the second loss function; and alternately training the inheritance network, the attribute enhancement network, the first discriminative network, and the second discriminative network based on the total loss function, unit the total loss function converges.

Specifically, a weighted sum of the first loss function and the second loss function may be used as the total loss function L. A specific formula is as follows:

$$L = \lambda_{o1} L_{inh} + \lambda_{o2} L_{att} \quad (23)$$

where $\lambda_{o1}$ and $\lambda_{o2}$ are different weight coefficients, and may be assigned according to importance of the loss functions.

In the joint training process, for example, the inheritance network and the attribute enhancement network may be first fixed, and the first discriminative network and the second discriminative network are trained. In this case, a value of the total loss function is expected to be as small as possible, to uniformly adjust parameters of the first discriminative network and the second discriminative network. Then, the first discriminative network and the second discriminative network may be fixed, and the inheritance network and the attribute enhancement network are trained. In this case, the value of the total loss function is expected to be as large as possible, to uniformly adjust the parameters of the inheritance network and the attribute enhancement network. After a plurality of rounds of training, when the total loss function converges, the joint training on the two networks is completed.

The data processing method for generating a face image according to the embodiments of this application is described above in detail with reference to FIG. 1 to FIG. 12. A data processing device for generating a face image according to the embodiments of this application is described below.

Figure 13:
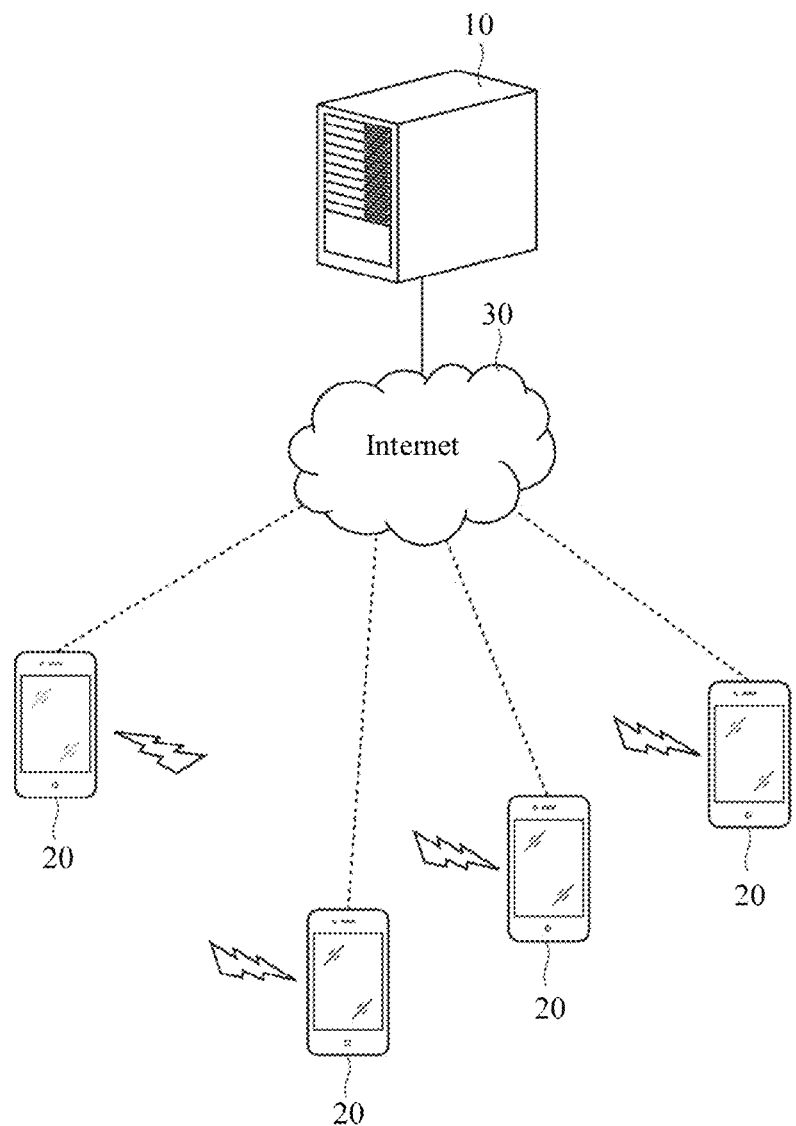
FIG. 13 is a schematic diagram of an application environment according to an embodiment of this application.

First, an application environment of the embodiments of this application is described briefly. As shown in FIG. 13, a server 10 is connected to a plurality of terminal devices 20 through a network 30. The plurality of terminal device 20 are devices for providing a first face image and a second face image as input sources. The terminal may be a smart terminal, for example, a smartphone, a personal digital assistant (PDA), a desktop computer, a notebook computer, or a tablet computer, or may be other types of terminals. The server 10 is a device configured to train the inheritance network and the attribute enhancement network based on an existing face database. In addition, the server is also a device that applies the trained inheritance network and attribute enhancement network to face image generation. Specifically, the server 10 is connected to the terminal device 20, receives the first face image and the second face image from the terminal device 20, generates a third face image or a fourth face image based on the trained inheritance network and attribute enhancement network on the server 10, and transmits the generated face image to the terminal device 20. The server 10 may be a data processing device described below. The network 30 may be any type of wired or wireless network, for example, the Internet. It is to be aware that, a quantity of terminal devices 20 shown in FIG. 13 is exemplary, and is not limited. Certainly, the data processing device for generating a face image according to the embodiments of this application may alternatively be a stand-alone device that is not connected to the network.

Figure 14:
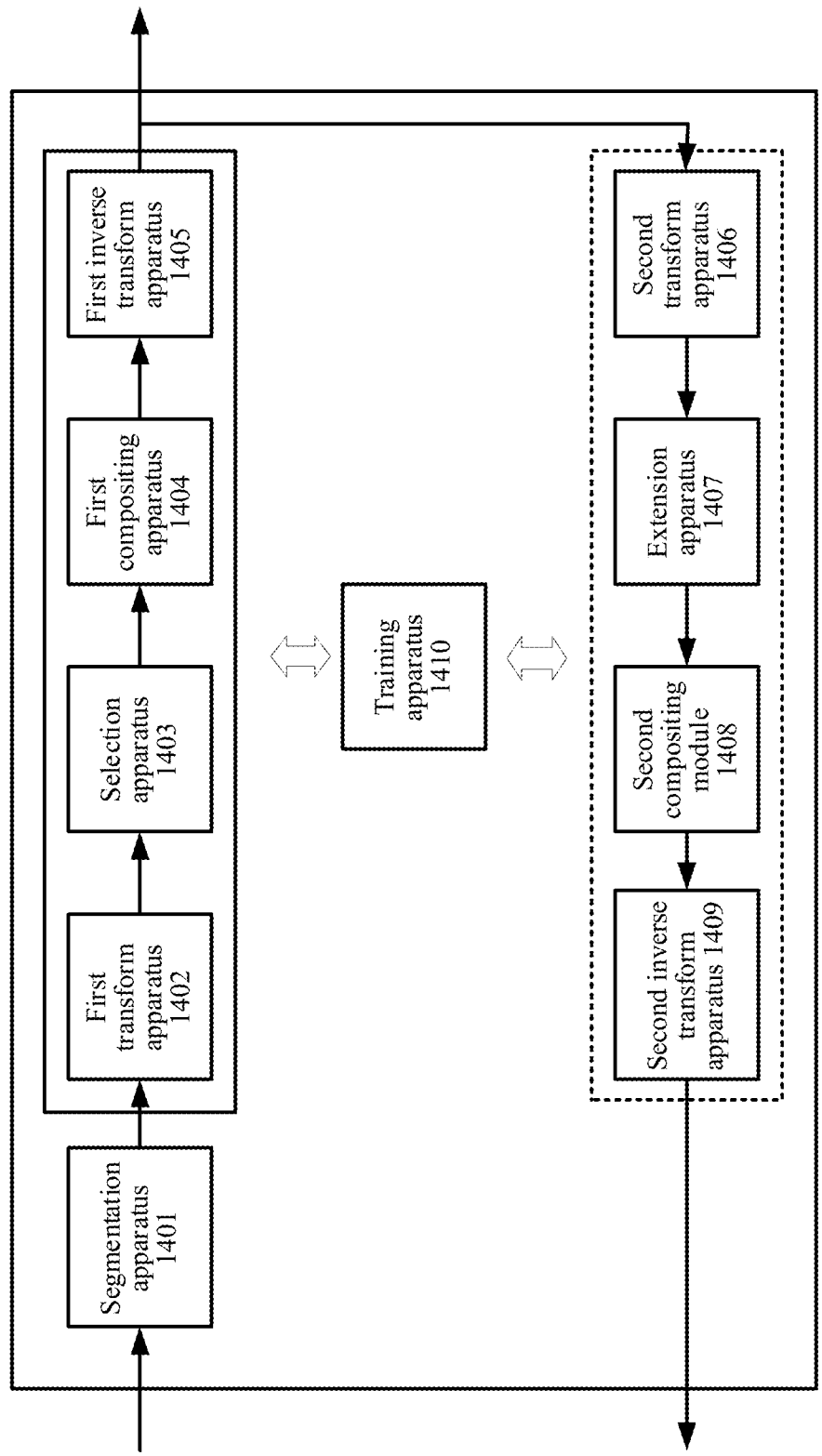
FIG. 14 is a functional block diagram of a configuration of a data processing device for generating a face image according to an embodiment of this application.

FIG. 14 shows a data processing device for generating a face image according to an embodiment of this application. As shown in FIG. 14, the data processing device 1400 includes: a segmentation apparatus 1401, a first transform apparatus 1402, a selection apparatus 1403, a first compositing apparatus 1404, and a first inverse transform apparatus 1405.

The segmentation apparatus 1401 is configured to: obtain M first image blocks corresponding to facial features from an inputted first face image, and obtain N second image blocks corresponding to facial features from an inputted second face image.

The first transform apparatus 1402 is configured to transform the M first image blocks and the N second image blocks to a feature space to generate M first feature blocks and N second feature blocks. The first transform apparatus 1402 may perform the transformation by using a first transform network (for example, an encoding network).

The selection apparatus 1403 is configured to select some first feature blocks and some second feature blocks according to a specified control vector.

In this embodiment of this application, the specified control vector includes L information bits corresponding to facial features, and the selection apparatus 1403 is further configured to: select, when an information bit in the specified control vector is a first value, a feature block of a facial feature corresponding to the information bit from the M first feature blocks, and select, when the information bit in the specified control vector is a second value, a feature block of the facial feature corresponding to the information bit from the N second feature blocks. L is a natural number, M≤L, and N≤L.

The first compositing apparatus 1404 is configured to generate a first composite feature map based on at least the selected some first feature blocks and some second feature blocks.

In addition, attributes (for example, an age and a gender) of an outputted third face image may be controlled. For example, the gender of the third face image expected to be outputted may be specified. In addition, there may be a relatively large difference between attribute information of the inputted first face image and second face image. Therefore, in another possible implementation, the first compositing apparatus 1404 is further configured to: extend specified attribute information into an attribute feature block in the feature space; and generate the first composite feature map based on the selected some first feature blocks and some second feature blocks and the attribute feature block.

The first inverse transform apparatus 1405 is configured to inversely transform the first composite feature map back to an image space to generate a third face image. The first inverse transform apparatus 1405 may perform the inverse transformation by using a first inverse transform network (for example, a decoding network). The first transform network and the first inverse transform network constitute an inheritance network.

In the data processing device for generating a face image according to the embodiments of this application, the third face image that inherits some facial features in the first face image and some facial features in the second face image may be generated through segmentation of facial feature images and recombination in the feature space. Compared with the solution of using a general-purpose processing network in the related art, it can ensure the similarity between the outputted third face image and the face images as input sources, while the outputted third face image is close to a real image. In other words, when the third face image is viewed by a user, it is difficult to distinguish whether the image is a real image or a composite image. In addition, by setting the control vector, facial features in the two inputted face images that the third face image inherits can be precisely controlled. In addition, through superimposition of the attribute feature block in the feature space, the attributes of the third face image may be specified, and the harmony and naturalness of the third face image can be further improved.

The main objective of the inheritance network is to output a third face image that is similar to the first face image and the second face image in the facial features. Therefore, the superimposition of the attribute feature block included therein is fine-tuning on the premise of ensuring the similarity. In other words, the third face image outputted by the inheritance network approximates the first face image and the second face image as the input sources with respect to attributes such as an age.

To adjust the attributes of the outputted face image within a larger range, in another possible implementation, the data processing device 1400 may further include: a second transform apparatus 1406, an extension apparatus 1407, a second compositing module 1408, and a second inverse transform apparatus 1409.

The second transform apparatus 1406 is configured to transform the third face image to the feature space to generate a third feature map. The second transform apparatus may perform the transformation by using a second transform network (for example, an encoding network), and the second transform network herein is different from the first transform network.

The extension apparatus 1407 is configured to extend specified attribute information into an attribute feature map in the feature space.

The second compositing module 1408 is configured to generate a second composite feature map based on the attribute feature map and the third feature map.

The second inverse transform apparatus 1409 is configured to inversely transform the second composite feature map back to the image space to generate a fourth face image. The second inverse transform apparatus may perform the transformation by using a second inverse transform network (for example, a decoding network), and the second inverse transform network herein is different from the first inverse transform network. The second transform network and the second inverse transform network constitute an attribute enhancement network.

The second transform apparatus 1406, the extension apparatus 1407, the second compositing module 1408, and the second inverse transform apparatus 1409 are optional, and therefore are shown in a dashed-line box in FIG. 14.

Compared with the third face image, the fourth face image may have a great change in attributes. For example, a fourth face image at an age of 5 years old may be outputted based on an inputted third face image at an age of 20 years old.

As described above, the inheritance network and the attribute enhancement network may include the encoding network and the decoding network, and both the encoding network and the decoding network include a plurality of to-be-determined parameters. The parameters are determined through a training process, to construct the inheritance network and the attribute enhancement network. In this way, the inheritance network and the attribute enhancement network can implement the function of generating a face image. In other words, before the application of the inheritance network and the attribute enhancement network, first, the inheritance network and the attribute enhancement network need to be trained.

Therefore, the data processing device 1400 further includes a training apparatus 1410.

The training apparatus 1410 is configured to train the inheritance network in training mode. Specifically, the training apparatus 1410 includes: a pre-exchange module, a first discriminative module, and a first training module.

The pre-exchange module is configured to: obtain L fifth image blocks corresponding to facial features from a fifth face image ($I_M$), obtain L sixth image blocks corresponding to facial features from a sixth face image ($I_F$), select some fifth image blocks and some sixth image blocks according to a first control vector to generate a first composite image ($\hat{I}_M$), and select some other fifth image blocks and some other sixth image blocks according to a second control vector to generate a second composite image ($\hat{I}_F$). In training mode, the segmentation apparatus is further configured to: obtain L seventh image blocks corresponding to facial features from the first composite image ($\hat{I}_M$), obtain L eighth image blocks corresponding to facial features from the second composite image ($\hat{I}_F$), and input the L seventh image blocks and the L eighth image blocks to the inheritance network. L is a natural number, M≤L, and N≤L.

The first discriminative module is configured to: receive at least one group of inheritance training data, and output, through a first discriminative network, a probability value used for discriminating whether the inputted inheritance training data is a real image. The at least one group of inheritance training data includes the fifth face image to the eighth face image, the seventh face image ($I'_M$) being generated through the inheritance network based on the some seventh image blocks and the some eighth image blocks that are selected according to the first control vector, and the eighth face image ($I'_F$) being generated through the inheritance network based on the some other seventh image blocks and the some other eighth image blocks that are selected according to the second control vector. The fifth face image is a supervision image for providing supervision information for the seventh face image, and the sixth face image is a supervision image for providing supervision information for the eighth face image.

The first training module is configured to alternately train the inheritance network and the first discriminative network based on a first loss function, unit the first loss function converges.

The first loss function is determined based on the probability value outputted by the first discriminative network for the at least one group of inheritance training data and pixel differences between face images and corresponding supervision images in the at least one group of inheritance training data.

Alternatively, in another possible implementation, the first loss function is further determined based on at least one of the following: differences between attributes of the face images and attributes of the corresponding supervision images in the at least one group of inheritance training data and differences between features of the face images and features of the corresponding supervision images in the at least one group of inheritance training data.

In addition, the training apparatus 1410 is further configured to train the attribute enhancement network in training mode.

Specifically, the training apparatus 1410 further includes a second discriminative module and a second training module.

The second discriminative module is configured to: receive at least one group of attribute training data, and output, through a second discriminative network, a probability value used for discriminating whether the inputted attribute training data is a real image. The at least one group of attribute training data includes the seventh face image to the tenth face image, the ninth face image ($I_M$) being outputted through the attribute enhancement network based on the seventh face image, and the tenth face image ($I_F$) being outputted through the attribute enhancement network based on the eighth face image. The seventh face image is a supervision image for providing supervision information for the ninth face image, and the eighth face image is a supervision image for providing supervision information for the tenth face image.

The second training module is configured to alternately train the attribute enhancement network and the second discriminative network based on a second loss function, unit the second loss function converges.

The second loss function is determined based on the probability value outputted by the second discriminative network for the at least one group of attribute training data and pixel differences between face images and corresponding supervision images in the at least one group of attribute training data.

Alternatively, in another possible implementation, the second loss function is further determined based on at least one of the following: differences between attributes of the face images and attributes of the corresponding supervision images in the at least one group of attribute training data and differences between features of the face images and features of the corresponding supervision images in the at least one group of attribute training data.

In addition, the training apparatus may further include: a joint training module, configured to: determine a total loss function based on the first loss function and the second loss function; and alternately train the inheritance network, the attribute enhancement network, the first discriminative network, and the second discriminative network based on the total loss function, unit the total loss function converges.

Because specific operations of the apparatuses in the data processing device according to the embodiments of this application completely correspond to the steps in the data processing method according to the embodiments of this application, to avoid redundancy, details of the specific operations are not described herein. A person skilled in the art may understand that, the steps of the data processing method according to the embodiments of this application are similarly applicable to the apparatuses of the data processing device according to the embodiments of this application.

Figure 15:
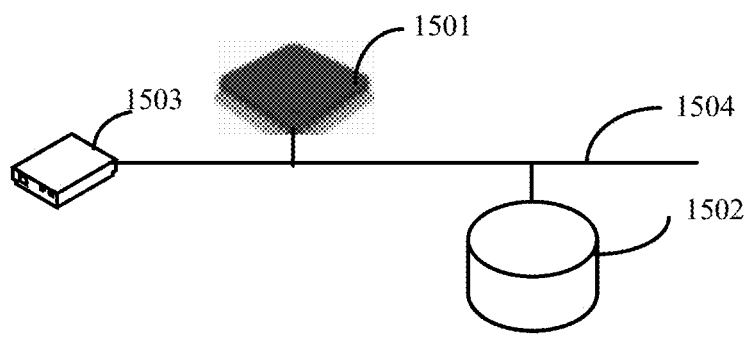
FIG. 15 shows an example of a data processing device for generating a face image as a hardware entity according to an embodiment of this application.

FIG. 15 shows an example of a data processing device for generating a face image as a hardware entity according to an embodiment of this application. The data processing device includes a processor 1501, memory 1502, and at least one external communication interface 1503. The processor 1501, the memory 1502, and the external communication interface 1503 are connected by using a communication bus 1504.

For data processing, the processor 1501 may be implemented by using a microprocessor, a central processing unit (CPU), a digital signal processor (DSP), or a field-programmable gate array (FPGA). The memory 1502 includes operation instructions. The operation instructions may be computer executable code. The steps in the data processing method for generating a face image in the foregoing embodiments of this application are implemented by using the operation instructions.

Figure 16:
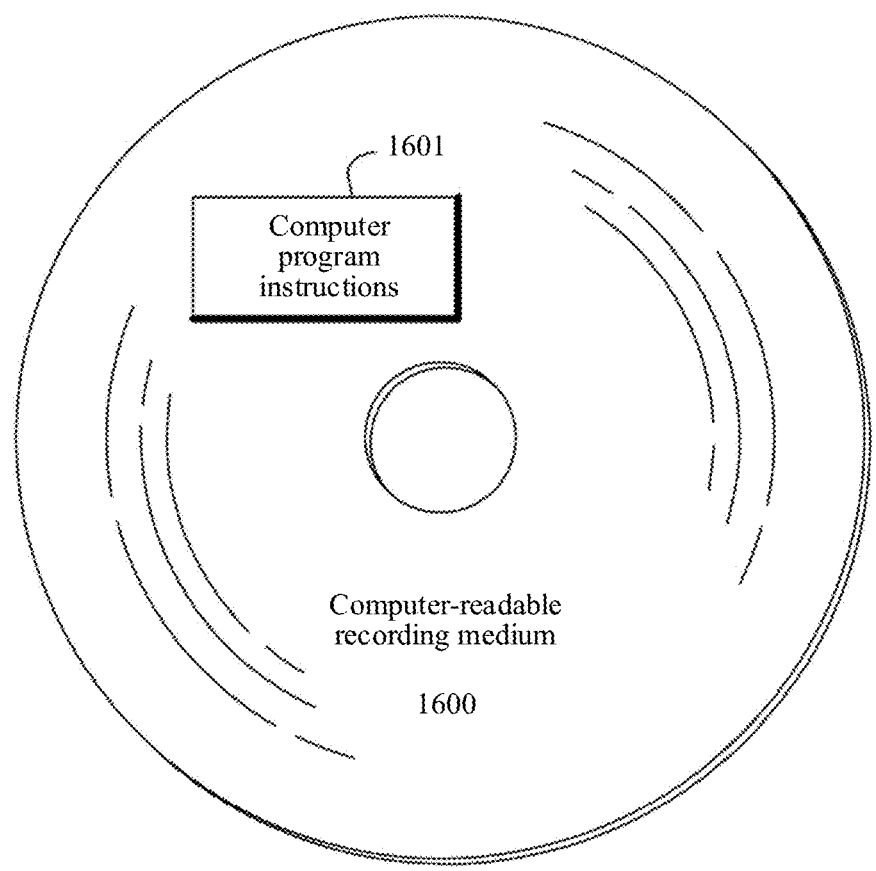
FIG. 16 is a schematic diagram of a computer-readable recording medium according to an embodiment of this application.

FIG. 16 is a schematic diagram of a non-transitory computer-readable recording medium (e.g., storage medium) according to an embodiment of this application. As shown in FIG. 16, the computer-readable recording medium 1600 according to this embodiment of this application stores computer program instructions 1601. The computer program instructions 1601, when executed by a processor, perform the data processing method for generating a face image according to the embodiments of this application described with reference to the foregoing accompanying drawings.

The embodiments of this application further provide a computer device, including a memory and a processor. The memory stores a computer program executable on the processor, and the processor, when executing the computer program, may implement the data processing method for generating a face image in the foregoing embodiments. The computer device may be the server or any device that can perform data processing.

So far, the data processing method and device for generating a face image and the medium according to the embodiments of this application have been described in detail with referring to FIG. 1 to FIG. 16. In the data processing method and device for generating a face image and the medium according to the embodiments of this application, the third face image that inherits some facial features in the first face image and some facial features in the second face image may be generated through segmentation of facial feature images and recombination in the feature space. Compared with the solution of using a general-purpose processing network in the related art, it can ensure the similarity between the outputted third face image and the face images as input sources, while the outputted third face image is close to a real image. In other words, when the third face image is viewed by a user, it is difficult to distinguish whether the image is a real image or a composite image.

In addition, in the inheritance network, by setting the control vector, facial features in the two inputted face images that the third face image inherits can be precisely controlled. Through superimposition of the attribute feature block in the feature space, the attributes of the third face image may be specified, and the harmony and naturalness of the third face image can be further improved. In addition, by using the additional attribute enhancement network, the attributes of the generated face image may be changed within a larger range. Moreover, through two facial feature exchanges in the training process, the training process of the inheritance network may be completed by directly using any existing face database without building a face database with a relationship between a father/mother and a child, thereby greatly reducing costs and implementation difficulty.

In this specification, the term "include", "comprise", or any other variant is intended to cover non-exclusive include, so that a process, a method, an article, or a device that includes a series of elements and that not only includes such elements, but also includes other elements not explicitly listed, or may further include elements inherent in the process, the method, the article, or the device. Unless otherwise specified, an element limited by "include . . . " does not exclude other same elements existing in the process, the method, the article, or the device that includes the element.

In addition, the foregoing series of processing not only include processing performed in the order described herein according to a time sequence, but also include processing performed in parallel or separately, rather than according to the time sequence.

Based on the foregoing description of the implementations, a person skilled in the art may clearly understand that the embodiments of this application may be implemented by using software in addition to a necessary hardware platform, or certainly, may be implemented by using software only. Based on such an understanding, all or the part of the technical solutions of the embodiments of this application contributing to the technology in the background part may be implemented in the form of a software product. The computer software product may be stored in a storage medium, such as a ROM/RAM, a magnetic disk, or an optical disc, and includes several instructions for instructing a computer device (which may be a personal computer, a server, or a network device) to perform the method described in the embodiments or some parts of the embodiments of this application.

The embodiments of this application are described above in detail. Although the principles and implementations of this application are described by using specific examples in this specification, the descriptions of the foregoing embodiments are merely intended to help understand the method and the core idea of the method of this application. Meanwhile, a person of ordinary skill in the art may make modifications to the specific implementations and application range according to the idea of this application. In conclusion, the content of this specification is not construed as a limit on this application.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

As used herein, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. The division of the foregoing functional modules is merely used as an example for description when the systems, devices, and apparatus provided in the foregoing embodiments performs training and/or data processing. In practical application, the foregoing functions may be allocated to and completed by different functional modules according to requirements, that is, an inner structure of a device is divided into different functional modules to implement all or a part of the functions described above.

What is claimed is:

1. A data processing method for generating a face image, performed by a computer device, the method comprising:
    obtaining a first face image ($I_{MA}$) and a second face image ($I_{FA}$);
    obtaining M first image blocks corresponding to facial features from the first face image ($I_{MA}$);
    obtaining N second image blocks corresponding to facial features from the second face image ($I_{FA}$);
    transforming the M first image blocks and the N second image blocks to a feature space to generate M first feature blocks and N second feature blocks;
    selecting a subset of the first feature blocks and a subset of the second feature blocks according to a specified control vector;
    generating a first composite feature map based on the selected subset of the first feature blocks and the selected subset of the second feature blocks; and
    inversely transforming the first composite feature map back to an image space to generate a third face image ($I_{o1}$),
    wherein M and N are positive integers greater than one.

2. The method according to claim 1, wherein the specified control vector comprises L information bits corresponding to facial features, L being an integer, M≤L, and N≤L, and
    the selecting a subset of the first feature blocks and a subset of the second feature blocks according to a specified control vector comprises:
        in accordance with a determination that an information bit in the specified control vector is a first value, selecting a feature block of a facial feature corresponding to the information bit from the M first feature blocks; and
        in accordance with a determination that the information bit in the specified control vector is a second value, selecting a feature block of the facial feature corresponding to the information bit from the N second feature blocks.

3. The method according to claim 1, wherein generating the first composite feature map comprises:
    extending specified attribute information into an attribute feature block in the feature space; and
    generating the first composite feature map based on the selected some first feature blocks and some second feature blocks and the attribute feature block.

4. The method according to claim 1, wherein the third face image is generated by inputting the M first image blocks and the N second image blocks to an inheritance network, and the inheritance network is obtained by performing the following training operations:
    obtaining L fifth image blocks corresponding to facial features from a fifth face image ($I_M$), and obtaining L sixth image blocks corresponding to facial features from a sixth face image ($I_F$), L being a natural number, M≤L, and N≤L;
    selecting some fifth image blocks and some sixth image blocks according to a first control vector to generate a first composite image ($\hat{I}_M$), and selecting some other fifth image blocks and some other sixth image blocks according to a second control vector to generate a second composite image ($\hat{I}_F$);
    obtaining L seventh image blocks corresponding to facial features from the first composite image ($\hat{I}_M$), and obtaining L eighth image blocks corresponding to facial features from the second composite image ($\hat{I}_F$);
    inputting the L seventh image blocks and the L eighth image blocks to the inheritance network;
    outputting, through the inheritance network, a seventh face image ($I'_M$) generated based on the some seventh image blocks and the some eighth image blocks that are selected according to the first control vector, and outputting an eighth face image ($I'_F$) generated based on the some other seventh image blocks and the some other eighth image blocks that are selected according to the second control vector, the fifth face image being a supervision image for providing supervision information for the seventh face image, the sixth face image being a supervision image for providing supervision information for the eighth face image, and the fifth face image to the eighth face image being used as a group of inheritance training data;

inputting at least one group of inheritance training data to a first discriminative network, the first discriminative network being configured to output, in a case that an image is inputted to the first discriminative network, a value of a probability that the image is a real image; and alternately training the inheritance network and the first discriminative network based on a first loss function, unit the first loss function converges.

5. The method according to claim 4, wherein the first loss function is determined based on the probability value outputted by the first discriminative network for the at least one group of inheritance training data and pixel differences between face images and corresponding supervision images in the at least one group of inheritance training data.

6. The method according to claim 5, wherein the first loss function is further determined based on one or more of:

differences between attributes of the face images and attributes of the corresponding supervision images in the at least one group of inheritance training data and differences between features of the face images and features of the corresponding supervision images in the at least one group of inheritance training data.

7. The method according to claim 4, further comprising:

transforming the third face image (Li) to the feature space to generate a third feature map;

extending specified attribute information into an attribute feature map in the feature space;

generating a second composite feature map based on the attribute feature map and the third feature map; and inversely transforming the second composite feature map back to the image space to generate a fourth face image ($I_{o2}$).

8. The method according to claim 7, wherein the fourth face image is generated by inputting the third face image to an attribute enhancement network, and the attribute enhancement network is obtained by performing the following training operations:

inputting the seventh face image ($I'_M$) and the eighth face image ($I'_F$) to the attribute enhancement network;

outputting, through the attribute enhancement network, a ninth face image ($I_M$) corresponding to the seventh face image and a tenth face image ($I_F$) corresponding to the eighth face image, the seventh face image being a supervision image for providing supervision information for the ninth face image, the eighth face image being a supervision image for providing supervision information for the tenth face image, and the seventh face image to the tenth face image being used as a group of attribute training data;

inputting at least one group of attribute training data to a second discriminative network, the second discriminative network being configured to output, in a case that an image is inputted to the second discriminative network, a value of a probability that the image is a real image; and alternately training the attribute enhancement network and the second discriminative network based on a second loss function, unit the second loss function converges.

9. The method according to claim 8, wherein the second loss function is determined based on the probability value outputted by the second discriminative network for the at least one group of attribute training data and pixel differences between face images and corresponding supervision images in the at least one group of attribute training data.

10. The method according to claim 9, wherein the second loss function is further determined based on one or more of:

differences between attributes of the face images and attributes of the corresponding supervision images in the at least one group of attribute training data and differences between features of the face images and features of the corresponding supervision images in the at least one group of attribute training data.

11. The method according to claim 8, wherein the inheritance network and the attribute enhancement network are further optimized by performing the following joint training operations:

determining a total loss function based on the first loss function and the second loss function; and alternately training the inheritance network, the attribute enhancement network, the first discriminative network, and the second discriminative network based on the total loss function, unit the total loss function converges.

12. A computer device, comprising:

one or more processors; and memory storing one or more programs that, when executed by the one or more processors, cause the one or more processors to perform operations comprising:

obtaining a first face image ($I_{MA}$) and a second face image ($I_{FA}$);

obtaining M first image blocks corresponding to facial features from the first face image ($I_{MA}$);

obtaining N second image blocks corresponding to facial features from the second face image ($I_{FA}$);

transforming the M first image blocks and the N second image blocks to a feature space to generate M first feature blocks and N second feature blocks;

selecting a subset of the first feature blocks and a subset of the second feature blocks according to a specified control vector;

generating a first composite feature map based on the selected subset of the first feature blocks and the selected subset of the second feature blocks; and inversely transforming the first composite feature map back to an image space to generate a third face image ($I_{o1}$), wherein M and N are positive integers greater than one.

13. The computer device according to claim 12, wherein the specified control vector comprises L information bits corresponding to facial features, L being an integer, M≤L, and N≤L, and the selecting a subset of the first feature blocks and a subset of the second feature blocks according to a specified control vector comprises:

in accordance with a determination that an information bit in the specified control vector is a first value, selecting a feature block of a facial feature corresponding to the information bit from the M first feature blocks; and in accordance with a determination that the information bit in the specified control vector is a second value, selecting a feature block of the facial feature corresponding to the information bit from the N second feature blocks.

14. The computer device according to claim 12, wherein generating the first composite feature map comprises:
    extending specified attribute information into an attribute feature block in the feature space; and
    generating the first composite feature map based on the selected some first feature blocks and some second feature blocks and the attribute feature block.

15. The computer device according to claim 12, wherein the third face image is generated by inputting the M first image blocks and the N second image blocks to an inheritance network, and
    the inheritance network is obtained by performing the following training operations:
    obtaining L fifth image blocks corresponding to facial features from a fifth face image ($I_M$), and obtaining L sixth image blocks corresponding to facial features from a sixth face image ($I_F$), L being a natural number, M≤L, and N≤L;
    selecting some fifth image blocks and some sixth image blocks according to a first control vector to generate a first composite image ($\hat{I}_M$), and selecting some other fifth image blocks and some other sixth image blocks according to a second control vector to generate a second composite image ($\hat{I}_F$);
    obtaining L seventh image blocks corresponding to facial features from the first composite image ($\hat{I}_M$), and obtaining L eighth image blocks corresponding to facial features from the second composite image ($\hat{I}_F$);
    inputting the L seventh image blocks and the L eighth image blocks to the inheritance network;
    outputting, through the inheritance network, a seventh face image ($I'_M$) generated based on the some seventh image blocks and the some eighth image blocks that are selected according to the first control vector, and outputting an eighth face image ($I'_F$) generated based on the some other seventh image blocks and the some other eighth image blocks that are selected according to the second control vector, the fifth face image being a supervision image for providing supervision information for the seventh face image, the sixth face image being a supervision image for providing supervision information for the eighth face image, and the fifth face image to the eighth face image being used as a group of inheritance training data;
    inputting at least one group of inheritance training data to a first discriminative network, the first discriminative network being configured to output, in a case that an image is inputted to the first discriminative network, a value of a probability that the image is a real image; and
    alternately training the inheritance network and the first discriminative network based on a first loss function, unit the first loss function converges.

16. The computer device according to claim 15, wherein the first loss function is determined based on the probability value outputted by the first discriminative network for the at least one group of inheritance training data and pixel differences between face images and corresponding supervision images in the at least one group of inheritance training data.

17. A non-transitory computer-readable storage medium storing instructions that, when executed by one or more processors of a computer device, cause the one or more processors to perform operations comprising:

obtaining a first face image ($I_{MA}$) and a second face image ($I_{FA}$);
obtaining M first image blocks corresponding to facial features from the first face image ($I_{MA}$);
obtaining N second image blocks corresponding to facial features from the second face image ($I_{FA}$);
transforming the M first image blocks and the N second image blocks to a feature space to generate M first feature blocks and N second feature blocks;
selecting a subset of the first feature blocks and a subset of the second feature blocks according to a specified control vector;
generating a first composite feature map based on the selected subset of the first feature blocks and the selected subset of the second feature blocks; and
inversely transforming the first composite feature map back to an image space to generate a third face image ($I_{o1}$),
wherein M and N are positive integers greater than one.

18. The non-transitory computer-readable storage medium according to claim 17, wherein the specified control vector comprises L information bits corresponding to facial features, L being an integer, M≤L, and N≤L, and
    the selecting a subset of the first feature blocks and a subset of the second feature blocks according to a specified control vector comprises:
    in accordance with a determination that an information bit in the specified control vector is a first value, selecting a feature block of a facial feature corresponding to the information bit from the M first feature blocks; and
    in accordance with a determination that the information bit in the specified control vector is a second value, selecting a feature block of the facial feature corresponding to the information bit from the N second feature blocks.

19. The non-transitory computer-readable storage medium according to claim 17, wherein generating the first composite feature map comprises:
    extending specified attribute information into an attribute feature block in the feature space; and
    generating the first composite feature map based on the selected some first feature blocks and some second feature blocks and the attribute feature block.

20. The non-transitory computer-readable storage medium according to claim 17, wherein the third face image is generated by inputting the M first image blocks and the N second image blocks to an inheritance network, and
    the inheritance network is obtained by performing the following training operations:
    obtaining L fifth image blocks corresponding to facial features from a fifth face image ($I_M$), and obtaining L sixth image blocks corresponding to facial features from a sixth face image ($I_F$), L being a natural number, M≤L, and N≤L;
    selecting some fifth image blocks and some sixth image blocks according to a first control vector to generate a first composite image ($\hat{I}_M$), and selecting some other fifth image blocks and some other sixth image blocks according to a second control vector to generate a second composite image ($\hat{I}_F$);
    obtaining L seventh image blocks corresponding to facial features from the first composite image ($\hat{I}_M$), and obtaining L eighth image blocks corresponding to facial features from the second composite image ($\hat{I}_F$);
    inputting the L seventh image blocks and the L eighth image blocks to the inheritance network;

outputting, through the inheritance network, a seventh face image ($I'_M$) generated based on the some seventh image blocks and the some eighth image blocks that are selected according to the first control vector, and outputting an eighth face image ($I'_F$) generated based on the some other seventh image blocks and the some other eighth image blocks that are selected according to the second control vector, the fifth face image being a supervision image for providing supervision information for the seventh face image, the sixth face image being a supervision image for providing supervision information for the eighth face image, and the fifth face image to the eighth face image being used as a group of inheritance training data;

inputting at least one group of inheritance training data to a first discriminative network, the first discriminative network being configured to output, in a case that an image is inputted to the first discriminative network, a value of a probability that the image is a real image; and alternately training the inheritance network and the first discriminative network based on a first loss function, unit the first loss function converges.

* * * * *